(12) United States Patent
Koenig et al.

(10) Patent No.: US 6,280,667 B1
(45) Date of Patent: *Aug. 28, 2001

(54) PROCESS FOR MAKING THERMOPLASTIC-BIOFIBER COMPOSITE MATERIALS AND ARTICLES INCLUDING A POLY (VINYLCHLORIDE) COMPONENT

(75) Inventors: Scott R. Koenig, Stillwater; Shankar Godavarti, Maplewood; Rodney K. Williams, Stacy, all of MN (US)

(73) Assignee: Andersen Corporation, Bayport, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 63 days.

(21) Appl. No.: 09/294,266

(22) Filed: Apr. 19, 1999

(51) Int. Cl.[7] ............................. B29C 47/06; B29C 47/40; B29C 47/78
(52) U.S. Cl. ............................. 264/68; 264/102; 264/141; 264/173.17; 264/177.1; 264/211; 264/211.23
(58) Field of Search ............................. 264/68, 102, 141, 264/173.17, 177.1, 211, 211.23; 366/75, 76.6; 425/203, 204

(56) References Cited

U.S. PATENT DOCUMENTS

| | | |
|---|---|---|
| 1,156,096 | 10/1915 | Price . |
| 2,188,396 | 1/1940 | Semon . |
| 2,489,373 | 11/1949 | Gilman . |
| 2,519,442 | 8/1950 | Delorme et al. . |
| 2,558,378 | 6/1951 | Petry . |
| 2,595,455 | 5/1952 | Heston . |
| 2,635,976 | 4/1953 | Meiler et al. . |
| 2,680,102 | 6/1954 | Becher . |
| 2,789,903 | 4/1957 | Lukman et al. . |
| 2,926,729 | 3/1960 | Zanini . |

(List continued on next page.)

FOREIGN PATENT DOCUMENTS

| | | |
|---|---|---|
| 2 042 176 | 4/1971 | (DE) . |
| 2 200.112 | 4/1974 | (FR) . |
| 2 344 101 | 10/1977 | (FR) . |
| 2 365 019 | 4/1978 | (FR) . |
| 2 445 885 | 8/1980 | (FR) . |
| 2 564 374 | 11/1985 | (FR) . |
| 2 104 903 A | 3/1983 | (GB) . |
| 2 171 953 A | 9/1986 | (GB) . |
| 2 186 655 A | 8/1987 | (GB) . |
| WO 90/08020 | 7/1990 | (WO) . |
| WO 92/07022 | 4/1992 | (WO) . |
| WO 99/11444 | 3/1999 | (WO) . |

OTHER PUBLICATIONS

Grassie, N. et al., "Polymer Degradation & Stabilisation", p. 152 (©1985).

(List continued on next page.)

*Primary Examiner*—Leo B. Tentoni
(74) *Attorney, Agent, or Firm*—Merchant & Gould P.C.

(57) ABSTRACT

The invention relates to polymer/wood fiber composite structural members that can be manufactured in an extrusion process engineered to produce the highest quality materials. The composite can be in a linear extrudate or pellet and can have a cross-section of any arbitrary shape, or can be a regular-geometric or of arbitrary-amorphous shape. The extruded material comprises a consistent proportion of polymer, wood fiber and water. During the extrusion, water is removed intentionally to dry the material to a maximum water content of less than about 10 wt-% based on the pellet weight. To make a structural unit, the pellet is introduced into an extruder apparatus wherein, under conditions of controlled mass throughput, shear, mechanical energy input, controlled temperature and pressure, the composite material is produced.

58 Claims, 5 Drawing Sheets

U.S. PATENT DOCUMENTS

| | | |
|---|---|---|
| 2,935,763 | 5/1960 | Newman et al. . |
| 2,992,679 | 7/1961 | Twaddle . |
| 3,147,518 | 9/1964 | Horgan, Jr. . |
| 3,287,480 | 11/1966 | Wechsler et al. . |
| 3,308,218 | 3/1967 | Wiegand et al. . |
| 3,309,444 | 3/1967 | Schueler . |
| 3,349,538 | 10/1967 | Crossman . |
| 3,376,603 | 4/1968 | Colombo . |
| 3,432,885 | 3/1969 | Zanini . |
| 3,492,388 | 1/1970 | Inglin-Knüsel . |
| 3,493,527 | 2/1970 | Schueler . |
| 3,524,222 | 8/1970 | Gregory et al. . |
| 3,562,373 | 2/1971 | Logrippo . |
| 3,645,939 | 2/1972 | Gaylord . |
| 3,671,615 | 6/1972 | Price . |
| 3,742,093 | 6/1973 | Skidmore . |
| 3,833,325 | 9/1974 | Ramsey . |
| 3,844,091 | 10/1974 | Vedvik et al. . |
| 3,878,143 | 4/1975 | Baumann et al. . |
| 3,888,810 | 6/1975 | Shinomura . |
| 3,899,559 | 8/1975 | Johnanson et al. . |
| 3,904,726 | 9/1975 | Jacquelin et al. . |
| 3,917,507 | 11/1975 | Skidmore . |
| 3,931,384 | 1/1976 | Forquer et al. . |
| 3,943,079 | 3/1976 | Hamed . |
| 3,956,541 | 5/1976 | Pringle . |
| 3,956,555 | 5/1976 | McKean . |
| 3,963,558 | 6/1976 | Skidmore . |
| 3,969,459 | 7/1976 | Fremont et al. . |
| 3,985,348 | 10/1976 | Skidmore . |
| 3,992,500 | 11/1976 | Kruder et al. . |
| 4,005,162 | 1/1977 | Bucking . |
| 4,012,348 | 3/1977 | Chelland et al. . |
| 4,016,232 | 4/1977 | Pringle . |
| 4,018,722 | 4/1977 | Baker . |
| 4,033,913 | 7/1977 | Sundén . |
| 4,045,603 | 8/1977 | Smith . |
| 4,056,591 | 11/1977 | Goettler et al. . |
| 4,058,580 | 11/1977 | Flanders . |
| 4,065,532 | 12/1977 | Wild et al. . |
| 4,071,479 | 1/1978 | Broyde et al. . |
| 4,097,648 | 6/1978 | Pringle . |
| 4,100,244 | 7/1978 | Nonaka . |
| 4,102,106 | 7/1978 | Golder et al. . |
| 4,107,787 | 8/1978 | Ocker . |
| 4,113,815 | 9/1978 | Kawamura . |
| 4,115,497 | 9/1978 | Halmø et al. . |
| 4,120,050 | 10/1978 | Craig et al. . |
| 4,127,635 | 11/1978 | Gauthier . |
| 4,145,389 | 3/1979 | Smith . |
| 4,168,251 | 9/1979 | Schinzel et al. . |
| 4,181,764 | 1/1980 | Totten . |
| 4,187,352 | 2/1980 | Klobbie . |
| 4,197,268 | 4/1980 | Anders . |
| 4,202,804 | 5/1980 | Porzel et al. . |
| 4,203,876 | 5/1980 | Dereppe et al. . |
| 4,228,116 | 10/1980 | Colombo et al. . |
| 4,239,679 | 12/1980 | Rolls et al. . |
| 4,243,629 | 1/1981 | Tramezzani . |
| 4,244,903 | 1/1981 | Schnause . |
| 4,248,743 | 2/1981 | Goettler . |
| 4,248,820 | 2/1981 | Haataja . |
| 4,250,222 | 2/1981 | Mavel et al. . |
| 4,263,184 | 4/1981 | Leo et al. . |
| 4,273,688 | 6/1981 | Porzel et al. . |
| 4,277,428 | 7/1981 | Luck et al. . |
| 4,281,039 | 7/1981 | Miura et al. . |
| 4,290,988 | 9/1981 | Nopper et al. . |
| 4,298,322 | 11/1981 | Anders et al. . |
| 4,305,901 | 12/1981 | Prince et al. . |
| 4,311,554 | 1/1982 | Herr . |
| 4,311,621 | 1/1982 | Nishizawa et al. . |
| 4,323,625 | 4/1982 | Coran et al. . |
| 4,328,136 | 5/1982 | Blount . |
| 4,371,375 | 2/1983 | Dennis, Jr. et al. . |
| 4,376,144 | 3/1983 | Goettler . |
| 4,382,108 | 5/1983 | Carroll et al. . |
| 4,393,020 | 7/1983 | Li et al. . |
| 4,414,267 | 11/1983 | Coran et al. . |
| 4,420,351 | 12/1983 | Lussi et al. . |
| 4,426,470 | 1/1984 | Wessling et al. . |
| 4,440,708 | 4/1984 | Hataaja et al. . |
| 4,454,091 | 6/1984 | Chion et al. . |
| 4,455,709 | 6/1984 | Zanini . |
| 4,481,701 | 11/1984 | Hewitt . |
| 4,490,104 | 12/1984 | Lantz . |
| 4,491,553 | 1/1985 | Yamada et al. . |
| 4,503,115 | 3/1985 | Hemels et al. . |
| 4,505,869 | 3/1985 | Mishibori . |
| 4,506,037 | 3/1985 | Suzuki et al. . |
| 4,508,595 | 4/1985 | Gåsland . |
| 4,551,294 | 11/1985 | Wottka et al. . |
| 4,562,218 | 12/1985 | Fornadel et al. . |
| 4,578,455 | 3/1986 | Pipper et al. . |
| 4,581,443 | 4/1986 | Garg . |
| 4,594,372 | 6/1986 | Natov et al. . |
| 4,597,928 | 7/1986 | Terentiev et al. . |
| 4,610,900 | 9/1986 | Nishibori . |
| 4,619,097 | 10/1986 | Trummer et al. . |
| 4,645,631 | 2/1987 | Hegenstaller et al. . |
| 4,659,754 | 4/1987 | Edwards et al. . |
| 4,663,103 | 5/1987 | McCullough et al. . |
| 4,663,225 | 5/1987 | Farley et al. . |
| 4,686,251 | 8/1987 | Ostermann et al. . |
| 4,687,793 | 8/1987 | Motegi et al. . |
| 4,716,062 | 12/1987 | Klein . |
| 4,734,236 | 3/1988 | Davis . |
| 4,737,532 | 4/1988 | Fujita et al. . |
| 4,769,109 | 9/1988 | Tellvik et al. . |
| 4,769,274 | 9/1988 | Tellvik et al. . |
| 4,774,272 | 9/1988 | Lamphere et al. . |
| 4,790,966 | 12/1988 | Sandberg et al. . |
| 4,791,024 | 12/1988 | Clerici et al. . |
| 4,798,473 | 1/1989 | Rauwendaal . |
| 4,818,604 | 4/1989 | Tock . |
| 4,820,463 | 4/1989 | Raufast . |
| 4,820,763 | 4/1989 | Yang . |
| 4,830,801 | 5/1989 | Rossberger et al. . |
| 4,837,977 | 6/1989 | Mauro . |
| 4,851,458 | 7/1989 | Hopperdietzel . |
| 4,865,788 | 9/1989 | Davis . |
| 4,894,192 | 1/1990 | Warych . |
| 4,899,673 | 2/1990 | Takimoto . |
| 4,900,494 | 2/1990 | Wobbe . |
| 4,902,455 | 2/1990 | Wobbe . |
| 4,906,421 | 3/1990 | Plamthottam et al. . |
| 4,915,764 | 4/1990 | Miani . |
| 4,927,579 | 5/1990 | Moore . |
| 4,929,409 | 5/1990 | Agren et al. . |
| 4,935,182 | 6/1990 | Ehner et al. . |
| 4,952,672 | 8/1990 | Moore et al. . |
| 4,954,303 | 9/1990 | Moore et al. . |
| 4,957,809 | 9/1990 | Davis . |
| 4,959,186 | 9/1990 | Dollhopf et al. . |
| 4,960,548 | 10/1990 | Ikeda et al. . |
| 4,968,463 | 11/1990 | Levasseur . |
| 4,973,440 | 11/1990 | Tamura et al. . |
| 4,978,489 | 12/1990 | Radvan et al. . |
| 4,978,575 | 12/1990 | Ziess . |
| 4,988,478 | 1/1991 | Held . |
| 5,002,713 | 3/1991 | Palardy et al. . |

| | | |
|---|---|---|
| 5,008,310 | 4/1991 | Beshay . |
| 5,009,586 | 4/1991 | Pallmann . |
| 5,020,915 | 6/1991 | Julien . |
| 5,021,490 | 6/1991 | Vyvoda et al. . |
| 5,028,266 | 7/1991 | Rettenmaier . |
| 5,049,334 | 9/1991 | Bach . |
| 5,051,222 | 9/1991 | Marten et al. . |
| 5,057,167 | 10/1991 | Gersbeck . |
| 5,075,057 | 12/1991 | Hoedl . |
| 5,075,359 | 12/1991 | Castagna et al. . |
| 5,078,937 | 1/1992 | Eela . |
| 5,080,845 | 1/1992 | Herrmann et al. . |
| 5,082,605 | 1/1992 | Brooks et al. . |
| 5,084,135 | 1/1992 | Brooks et al. . |
| 5,087,400 | 2/1992 | Theuveny . |
| 5,088,910 | 2/1992 | Goforth et al. . |
| 5,093,058 | 3/1992 | Harmon et al. . |
| 5,096,046 | 3/1992 | Goforth et al. . |
| 5,096,406 | 3/1992 | Brooks et al. . |
| 5,100,545 | 3/1992 | Brooks . |
| 5,120,776 | 6/1992 | Raj et al. . |
| 5,125,824 | 6/1992 | Schaarschmidt . |
| 5,130,070 | 7/1992 | Martin . |
| 5,137,975 | 8/1992 | Kelusky . |
| 5,165,941 | 11/1992 | Hawley . |
| 5,183,837 | 2/1993 | Lepori et al. . |
| 5,185,117 | 2/1993 | Hawley . |
| 5,186,876 | 2/1993 | Purstinger et al. . |
| 5,198,170 | 3/1993 | Hawrylko . |
| 5,205,972 | 4/1993 | Kafka . |
| 5,281,379 | 1/1994 | Noguchi et al. . |
| 5,306,132 | 4/1994 | Grundmann et al. . |
| 5,306,452 | 4/1994 | Todd . |
| 5,358,680 | 10/1994 | Boissonnat et al. . |
| 5,437,826 | 8/1995 | Martinello et al. . |
| 5,441,801 | 8/1995 | Deaner et al. . |
| 5,442,041 | 8/1995 | Mallikarjun et al. . |
| 5,458,478 | 10/1995 | Stibal et al. . |
| 5,468,429 | 11/1995 | Li et al. . |
| 5,518,677 | 5/1996 | Deaner et al. . |
| 5,536,462 | 7/1996 | Hawrylko . |
| 5,589,203 | 12/1996 | Sato . |
| 5,597,235 | 1/1997 | Barnes et al. . |
| 5,650,107 | 7/1997 | Vetter et al. . |
| 5,695,874 | 12/1997 | Deaner et al. . |
| 5,712,319 | 1/1998 | Suzuki et al. . |
| 5,728,337 | 3/1998 | Yoshikawa et al. . |
| 5,804,111 | 9/1998 | Kobayashi et al. . |
| 5,827,607 | 10/1998 | Deaner et al. . |
| 5,851,463 | 12/1998 | Güntherberg et al. . |
| 5,910,276 | 6/1999 | Güntherberg et al. . |
| 5,932,691 | 8/1999 | Khanin et al. . |
| 5,938,994 | 8/1999 | English et al. . |
| 5,958,316 | 9/1999 | Güntherberg et al. . |
| 6,054,207 | 4/2000 | Finley . |
| 6,143,811 | 11/2000 | Oda et al. . |

OTHER PUBLICATIONS

Macosko, C., "Rheology—Principles, Measurements and Applications", pp. 100–101 (©1994).

Meijer, H. et al., "The Modeling of Continuous Mixers. Part I: The Corotating Twin–Screw Extruder", *Polymer Engineering and Science*, vol. 28, No. 5, pp. 275–289 (Mar. 1988).

Rauwendaal, C., "Twin Screw Extruders" and "Truobleshooting Extruders", *Polymer Extrusion*, pp. 458–477 and 522–533 (©1986).

Dalväg, H. et al., "The Efficiency of Cellulosic Fillers in Common Thermoplastics. Part II. Filling with Processing Aids and Coupling Agents", *International Journal of Polymeric Materials*, vol. 11, No. 1, pp. 9–38, (1985).

Klason, C. et al., "The Efficiency of Cellulosic Fillers in Common Thermoplastics. Part I. Filling without Processing Aids or Coupling Agents", *International Journal of Polymeric Materials*, vol. 10, No. 3, pp. 159–187 (1984).

Kokta, B. et al., "Composites of Poly(Vinyl Chloride) and Wood Fibers Part II: Effect of Chemical Treatment", *Polymer Composites*, vol. 11, No. 2, pp. 84–89 (Apr. 1990).

Kokta, B. et al., "Composites of Polyvinyl Chloride—Wood Fibers. I. Effect of Isocyanate as a Bonding Agent", *Polymer—Plastics Technology Engineering*, vol. 29, Nos. 1&2 (1990).

Kokta, B. et al., "Use of Wood Fibers in Thermoplastic Composites", *Polymer Composites*, vol. 4, No. 4, pp. 229–232 (Oct. 1983).

Raj. R. et al., "Use of Wood Fibers in Thermoplastics. VII. The Effect of Coupling Agents in Polyethylene–Wood Fiber Composites", *Journal of Applied Polymer Science*, vol. 7, No. 4, pp. 1089–1103 (Jan. 20, 1989).

Rogalski, M. et al., "Poly–Vinyl–Chloride) Wood Fiber Composites", *Antec '87*, Society of Plastics Engineers 45$^{th}$ Annual Technical Conference & Exhibit, pp. 1436–1440, (Date Unknown).

Sean, S. et al., "A Study of the Mechanical Properties of Wood Fiberpolystyrene Composites", *Drevársky Výskum*, Zväzok 133 (1992).

Woodhams, R. et al., "Wood Fibers as Reinforcing Fillers for Polyolefins", *Polymers Engineering and Science*, vol. 24, No. 15, pp. 1166–1171 (Oct. 1984).

Yam, K. et al., "Composites From Compounding Wood Fibers With Recycled High Density Polyethylene", *Polymer Engineering and Science*, vol. 30, No. 11, pp. 693–699 (Mid–Jun. 1990).

Zadorecki, P. et al., "Future Prospects for Wood Cellulose as Reinforcement in Organic Polymer Composites", *Polymer Composites*, vol. 10, No. 2, pp. 69–77 (Apr. 1989).

Abstract of Japan 59–156712 (Jun. 9, 1984).

"Advantages of a Preventive Maintenance Program", *Processing Lines A Periodic Look at Twin Screw Technology*, vol. 7, No. 1,6 pgs. (Date Unknown).

Brauer, F., "New Technology for Dewatering of Polymers Using Twin–Screw Extrusion", *Processing Lines A Periodic Look at Twin Screw Technology*, vol. 5, No. 3, 4 pgs. (Date Unknown).

Jackson, S., "Scaleup of Twin–Screw Extrusion Processes", *Processing Lines A Periodic Look at Twin Screw Technology*, vol. 6, No. 1, 4 pgs. (Date Unknown).

Jackson, S., "Scaleup of Twin–Screw Extrusion Processes", *Processing Lines A Periodic Look at Twin Screw Technology*, vol. 6, No. 2, 4 pgs. (Date Unknown).

Jackson, S. "Scaleup of Twin–Screw Extrusion Processes", *Processing Lines A Periodic Look at Twin Screw Technology*, vol. 6, No. 4, 4 pgs. (Date Unknown).

Machado, A. et al., "Processing Wood–Polymer Composites On Twin Screw Extruders" *Woodfiber–Plastic Composites Conference*, Madison, WI, 24 pgs. (May 12, 1997).

Mielcarek, D., "Developing Scaling Up, Implementaing and Improving the TwinScrew Extrusion Process", *Processing Lines A Periodic Look at Twin Screw Technology*, vol. 9, No. 1, 5 pgs. (Jan. 1999).

Mielcarek, D., "Processing Tips", *Processing Lines A Periodic Look at Twin Screw Technology,* vol. 2, No. 3, 4 pgs (Date Unknown).

Mielcarek, D., "Processing Tips Compounding Highly Filled Polymers", *Processing Lines A Periodic Look at Twin Screw Technology,* vol. 5, No. 2, 4, pgs. (Date Unknown).

"New Side Vent for ZSK Compounder Improves Product Quality", *Processing Lines A Periodic Look at Twin Screw Technology,* vol. 3, No. 1, pg. (Date Unknown).

"New ZSK 25 World Lab Extruder Shown at NPE", *Processing Lines A Periodic Look at Twin Screw Technology,* vol. 6, No. 3, 4 pgs. (Date Unknown).

Ploski, W., "PVC Compounding as We Approach the Millennium", *Processing Lines A Periodic Look at Twin Screw Technology,* vol. 9, No. 3, 4 pgs. (Aug. 1999).

"Polymer Composites: Key Technical Considerations for Achieving Reliable Performance from Reinforcements", *Processing Lines A Periodic Look at Twin Screw Technology,* vol. 3, No. 5, 6 pgs. (Date Unknown).

Rauwendaal, C., Polymer Extrusion, Hanser Publishers, New York, pp. 24–27, 316–323, 390–403, 499–505 (1986).

"Recycling/Compounding Via ZSK Twin–Screw Extruders Yields Better Products, Better Econmics", *Processing Lines A Periodic Look at Twin Screw Technology,* vol. 3, No. 2, 6 pgs. (Date Unknown).

Stropoli, T., "Compounding and Pelletizing Wood Fiber and Polymers with Buss Kneaders", The Fourth Interantional Conference on Woodfiber Plastic Composites, pp. 50–56 (Date Unknown).

"Taking Chemical Reactions Out Of the Batch Process Mode: Continuous Reaction Processing On The Twin-–Screw Extruder", *Processing Lines A Periodic Look at Twin Screw Technology,* vol. 4, No. 2, 4 pgs. (Date Unknown).

"Twin–screw compounder ZSK, development and processing techonology", *Werner & Pfleiderer,* 31 pgs. (Date Unknown).

Uberall, M. et al., "Devolatilization Operations for High Volume Polyolefin Solutions", *Krupp Werner Pfleiderer–Technical Papers,* 3 pgs. (Jul. 18, 2000).

"WP's New Mega–Compounder: Productivity by Design", *Processing Lines A Periodic Look at Twin Screw Technology,* vol. 6, No. 3, 4 pgs. (Date Unknown).

Titow, W., "PVC Technology," *Elsevier Applied Science Publishers LTD.,* Fourth Edition, pp. 250–254 (1984).

Whelan, A. et al., "Developments In PVC Production And Processing–1," *Applied Science Publishers LTD,* pp. 63–90 (1977).

PROCESS FOR MAKING THERMOPLASTIC-BIOFIBER COMPOSITE MATERIALS AND ARTICLES INCLUDING A POLY (VINYLCHLORIDE) COMPONENT

FILED OF THE INVENTION

This invention relates to a composite and to processes for preparing a thermoplastic-biofiber composite material with improved properties in a dense composite. More specifically, the composite materials comprise thermoplastic poly (vinylchloride) polymer composition and biofiber. The invention also extends to extruded pellets and to structural members made from the pellets using the process. The structural member includes any extrudable object including a lineal piece or a linear hollow profile having complex cross-sections.

BACKGROUND OF THE INVENTION

Prior art processes for preparing thermoplastic polymer-biofiber composite materials containing poly(vinylchloride) (PVC, or hereinafter simply called "polymer") and a biofiber such as a wood fiber teach the pre-blending and single addition of all components to extruders. Melt processes for such composites are disclosed in Deaner et al., U.S. Pat. No. 5,827.607 and Deaner et al., U.S. Pat. No. 5,518,677. Process equipment manufacturers routinely suggest that intimate mixing and throughput can be more effectively optimized by independently introducing polymer and biofiber at different points in the process. For example, a publication in the Proceedings of the Fourth International Conference on Wood Fiber-Plastics Composites; May 12–14, 1997; published by Forest Products Society, Madison, Wis. 53705-2295; entitled *Processing Wood-Polymer Composites on Twin Screw Extruders*, authored by Augie Machado and Charlie Martin of American Leistritz Extruder Corp., teach that wood fiber should be added to fluxed (melt/sheared) polymer. Fluxed polymer is sheared polymer in melt form, said form arising from both mechanical action and heat input. The input of shear causes fusing to form a viscous liquid (fluidic), visco-elastic polymer mass of relatively low viscosity compared to unheated or unsheared polymer. Mixing with polymer at low viscosity helps to avoid shear stresses capable of breaking wood fibers. Similarly, Krupp Werner & Pfleiderer newsletter, *Processing Lines*, Vol. 9, no. 1, January 1999 suggests in FIG. 10 that fillers/fibers should be added after polymer has been melt-plasticated. When applicants, attempted to follow this prevailing teaching in the art and, added moist wood fiber to fluxed polymer, they surprisingly noted that under some conditions, that the steam pressure generated caused separation and forceful venting of wood fibers at vent ports. Vented steam and other volatiles arising from the composition at elevated temperature provided sufficient energy to interfere with melt processing.

In a variation of the process schematically shown in FIG. 1 of U.S. Pat. No. 5,518,677, applicants determined (contrary commonly accepted teaching, i.e., polymer first followed by wood fiber) that wet wood fiber could be added first and the bulk of the resulting steam vented from the process prior to adding, melting, and mixing of thermoplastic polymer to form a dense composite. U.S. Pat. Nos. 5,827,607 and 5,518,677 further suggest that composites can be prepared by heating the fluxed polymer to lower its viscosity thus improving wood fiber mixing and wetting processes, In so doing, all exterior surfaces of the fiber can be fully contacted by polymer and pores, crevice, cracks, passage ways, indentations, etc. become fully filled with polymer thus forming a composite having an exterior continuous polymer phase in which wood particles are dispersed as a discontinuous phase within the continuous thermoplastic phase. U.S. Pat. No. 5,518,677 further suggests that the temperature, pressure, and shear conditions during dispersive mixing must be sufficient to disrupt fiber cells and force polymer into the interior volume of the cells significantly increasing the density of the composite.

In the practice of this process technology, other process complications arise. Thermoplastic polymers particularly PVC composition, can thermally degrade at temperatures slightly above their melting points. This degradation is especially problematic when the products of the chemical reactions are toxic and corrosive. Such is the case with PVC where the degradation product is hydrochloric acid vapor (HCl). When moist biofiber is processed corrosive hydrochloric acid can be also produced when acid vapor combines with moisture. Since PVC decomposition proceeds by a free radical mechanism, decomposition can be autocatalytic especially in the presence of moisture, entrained oxygen (from fiber-trapped air), and hydrogen chloride. When polymer free radicals react, crosslinking can occur producing a rapid increase in melt viscosity and mixing torque. Gel Permeation chromatography reveals the effect of crosslinking in the form of broadened molecular weight distributions. Crosslinking of PVC reduces its utility in thermoplastic products and processes. Attempts to control this free-radical decomposition include addition of stabilizers most of which are free-radical scavengers. Recognizing this problem, many equipment manufacturers recommend that users of their equipment avoid production of PVC-biofiber composites unless special alloys are used in regions of the equipment where HCl production is likely to occur. Furthermore, upon experiencing an increase in mixing torque attributed to decomposition and crosslinking reactions, the manufacturers recommend shutting down the process before the viscosity increase causes the screw to seize in the extruder barrel, leading to an uncontrollable temperature rise with simultaneous evolution of significant and hazardous quantities of HCl.

Rauwendall, U.S. Pat. No. 4,798,473, describes the design of an extruder screw suitable for the continuous extrusion of various poly(ethylene) plastics that reduces induced power consumption and stock temperature generation. Poly(ethylene) polymers have a different melt flow character than PVC. Polyolefins are generally more stable and with similar molecular weights have lower viscosity at a defined temperature. Rauwendall mentions the severe problems that can occur when plastics having limited thermal stability, as for instance, poly(vinylchloride) (PVC) are processed at high screw induced stock temperatures.

Rauwendall, *Polymer Extrusion*, Hanser Publishing, 1994, p 529–32, discusses the calculation of the adiabatic and isothermal temperature rise expected in the narrow clearance gap between the barrel and top of the screw flights and concludes that the local temperature in gap can be widely vary in the range of from about 30° C. to greater 150° C. Rauwendall (Supra), p 398–99 describes multi-vent devolatilization and cascade devolatilzation processes for single screw extruders having various screw designs. He discusses the use of two extruders to devolatilize PVC which preferably passes through a stranding die and long vacuum transition box en route to a second single screw extruder. No mention is made of the pressures at which any of the vents operate.

Clearly, known combinations of equipment, processing parameters and material parameters suggest that optimizing process conditions, composite throughput and power consumption can be a complex undertaking. Some of process equipment parameters include barrel volume, temperature, temperature profile, pressure, shear rate, mass transfer, heat transfer, etc. Some of the material blend parameters include fluxed polymer stability, polymer rheology, fiber size and shape, moisture content, additive selection, etc.

SUMMARY OF THE INVENTION

The invention provides a continuous process for making a dense, thermoplastic-biofiber composite material including PVC as an important component. The biofiber is dried in a fashion that removes water and converts the biofiber cells to an open form that can permit entry of the fluxed resin into the fiber cells. The drying step pops the fiber cells like popcorn and releases water while preparing the cells for composite formation. Contrary to the teaching of the art, applicants have unexpectedly found that by including cascaded vacuum devolatilization steps in the process that thermally sensitive PVC biofiber composites can be processed at temperatures greater than 195° C. for more than 5 seconds where PVC degradation is known to occur with some HCl generation. The continuous process intimately mixes thermoplastic polymer, including PVC, biofiber, and optional recycle material in a processor capable of delivering high levels of mechanical shear energy (per unit mass of material passing through the processor) to form a dense polymer wood composite. These processes are conducted at an internal pressure of about 300 to 800 or preferably 600 to 800 psi within the barrel of the processor shear zones. This amount of shear is sufficient to cause creation of a fluid polymer in the processor when under instant condition, with little or no shear, the polymer retains substantial mixed solid/solid form in combination with the solid fiber. The viscosity of the polymer fluid in the processor is about 5000 to 6500 pascal-seconds at a shear of 150 sec$^{-1}$ and 190° C. Within the dense composite, the polymer mixture has been fused to form a continuous organic phase with the wood fiber (with insoluble recycled materials) forming a discontinuous phase suspended and distributed throughout the polymer phase. The separation or dispersion of agglomerated wood and regrind fibers when used and their subsequent distribution requires input of a substantial amount mechanical energy. Such mechanical shear energy can be delivered by a variety of mixing means including various types of screw mixers wherein the materials are mixed under high shear conditions until the appropriate degree of wetting and intimate contact is achieved between polymer and fiber. Screw mixers, especially extruders, are ideally suited for cascading continuous chemical process unit operations because small, controlled volumes of material sequentially pass through isolated zones of the screw(s) where process parameters can be monitored and automatically controlled. The amount of mass processed by the processor is about 10 to 5000 kg-hr$^{-1}$. However, practice of the inventive process is not intended to be limited to screw extruders. The inventive process includes process steps wherein input biofiber moisture is partially removed prior to mixing of biofiber and fluxed polymer. After the composite is fully mixed and blended, most of the remaining moisture, volatile decomposition products, and low molecular weight plasticizing biofiber components are removed at a removal station, leaving less than 1.5 wt.-% moisture, preferable less than 1 wt.-% moisture preferably less than 8000 ppm moisture in the composite. The heated composite is exposed to atmospheric pressure or reduced pressure at elevated temperature for a sufficient period of time to remove these undesirable volatile products.

In a second embodiment of the invention, biofiber is dried, blended with polymer resin, and then simultaneously sheared, compressed and heated to melt the polymer resin prior to the intimate mixing and cascade devolatilization process steps that form the dense composite.

A third embodiment of the invention provides articles produced using the inventive process. The articles include, but are not limited to extruded pellets and structural members. Structural members are formed by direct melt extrusion of the dense composite through a shaping die to form linear profiles. Alternatively, the members and profiles can be formed by secondary extrusion of preformed pellets made by pelletizing the dense composite exiting the inventive process. In either case, optional functional materials can be used, including foaming agents blended with the dense composite or re-melted pellets prior to extrusion of profiles through the shaping die. Optionally, one or more capstocks can be coextruded on the exterior or onto pre-determined regions of the exterior surface of the structural members. The structural members can be used in any structural unit, preferably they are adapted to extrusion or injection molding processes that provide members having improved properties when used in fenestration components such as windows and doors. Such members can have complex cross-sections wherein interior regions are spanned by webs totally enclosing portions of the interior that improve the gravitational and wind load bearing properties of the members. More specifically, structural members pertaining to these applications are alternatively known as rails, jambs, stiles, sills, tracks, stop and sash, nonstructural trim elements such as grid, cove, bead, quarter round, etc. Polymer is defined as a thermoplastic composition including poly(vinylchloride) (PVC). Processor is defined as generic continuous process equipment capable of high shear mixing that efficiently couples mechanical energy per unit mass (specific mechanical energy-SME) into the material passing through the processor, the process imparts greater than 280 Kj–Kg$^{-1}$, preferably about 300 to 500 Kj–Kg$^{-1}$, most preferably 340 to 450 Kj–Kg$^{-1}$. Process efficiency is a dimensionless quantity defined as the actual power (typically kilowatts) consumed by the processor shear producing elements divided by the maximum power (typically kilowatts) capability of the processor and is typically about 0.70 to 0.90, when the process unit is an extruder or Buss kneader the shear-producing element is the screw (or screws in the case of multiple screw devices). Specific Mechanical energy (SME) is defined as the energy per unit mass (kilojoules per kilogram, preferably greater than 280 Kj–Kg$^{-1}$, preferably about 300 to 500 Kj–Kg$^{-1}$, most preferably 340 to 450 Kj–Kg$^{-1}$) (i.e.) mechanical portion of the energy imparted to material as it is passes through the processor. Minimum Specific Mechanical Energy (MSME) is a defined as the energy per unit mass (kilojoules per kilogram) required to form the dense thermoplastic-biofiber composite material. Relative Screw Rotation is defined as actual screw rotation speed divided by machine maximum and comprises at about a minimum between about 200–400 rpm with a maximum between about 570–1200) of about 0.35 to 0.70. Relative power is defined as the maximum power delivered by the processor (kilowatts) divided by the minimum specific mechanical energy (kilojoules per kilogram or frequently kilowatt hours per kilogram) required to form the dense composite material is at least about 280 Kj–Kg$^{-1}$(kW-hr-kg$^{-1}$).

BRIEF DESCRIPTION OF THE DRAWINGS

The invention may be more completely understood by considering the detailed description of various embodiments of the invention hereinafter in connection with the accompanying drawings.

Figure 1:
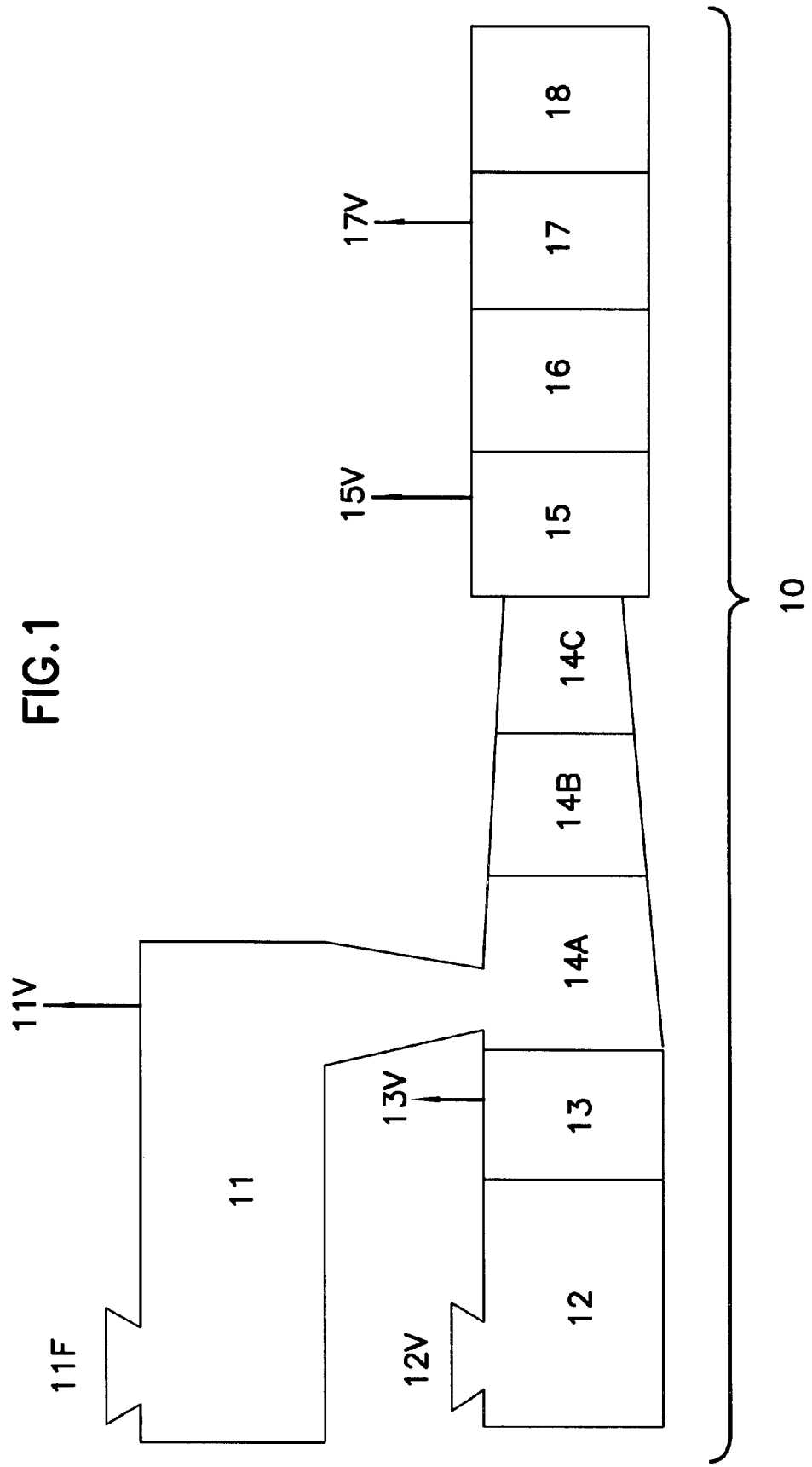
FIG. 1 shows a schematic diagram of a generic multi-zone processor suitable for practicing the inventive process.

While the invention is amenable to various modifications and alternative forms, specifics thereof have been shown by way of example in the drawings and will be described in detail. The intention is to not limit the invention to the particular embodiments described. On the contrary, the invention is to cover all modifications, equivalents, and alternatives falling within the spirit and scope of the invention as defined by the appended claims.

DETAILED DESCRIPTION OF THE INVENTION

The invention relates to continuous processes for preparing dense, thermoplastic biofiber composite materials. The dense composite comprises biofiber that is intimately contacted and wetted by organic materials. The intimate contact and wetting between composite components ensures high quality physical properties when the composite is formed into articles including pellets and structural members that further include linear, hollow profiles. Applicants have unexpectedly found that thermally sensitive polymer-biofiber composites can be efficiently processed at temperatures above the decomposition temperature of thermally sensitive PVC, typically above 195° C. for greater than 5 seconds often more than 60 seconds or more. Higher temperature processes implies a greater thermodynamic efficiency than prior art processes, which means improved more dense composite material can be produced per unit of power consumed.

Contrary to the teaching of the art, applicants process (melt, mix, and compress) thermoplastics including PVC using temperatures at or above the decomposition temperature with minimal HCl generation. Small amounts of vapor HCl produced does not relate to a major polymer decomposition, crosslinking or a compromised structural nature of the polymer. Applicants use high temperature, depending on premix, to attain improved properties (200° C. to greater than 212° C.) up to 230° C. but limit the time PVC is processed at elevated temperature (temperatures exceeding about 212° C.) to an absolute minimum using conditions that can prevent thermal decomposition, and quench incipient free radical PVC decomposition reactions by abruptly expanding and cooling composite while simultaneously venting autocatalytic volatiles from the process. Finally, applicants use stabilizers to lengthen the endothermic induction period prior to the onset of decomposition and exploit the lengthened induction period to efficiently accomplish the dispersive and distributive mixing operations required to produce dense composite at high temperature. Using current equipment with processing zones operating at 300 to 800 psi, temperature is maintained at less than 200° C. for at least 2 seconds without PVC decomposition.

A continuous process for making dense, thermoplastic-biofiber composite is shown in FIG. 1, schematically depicting a generic, multi-zoned processor (10) suitable for practicing the inventive process. The processor has a minimum of eight isolated zones and means for continuously transporting materials between zones. The materials conveyed between zones include particulate solids, viscous fluxed polymer, and fluxed polymer-like mixtures. Each of the eight zones has independent means for controlling temperature and pressure control. First zone (11) includes vent (11V), and biofiber feed port (11F). Moist biofiber enters first zone (11) through feed port (11F). The temperature in the first zone is maintained at 100° C. or greater and the pressure is maintained at about ambient atmospheric by means of vent port (11V). Moist biofiber is retained in first zone (11) for sufficient time to vaporize and vent loosely bound moisture resulting in a dried fiber with less than 7 wt % water preferably up to about 2 wt % moisture. Best operation leave less than 1.5 wt.-% moisture, preferably less than 1 wt.-% moisture preferably less than 8000 ppm moisture in the composite. Granular thermoplastic polymer resin including poly(vinylchloride), enters second zone (12) through said second feed port (12F) where it is heated, compressed, and sheared thus fusing to form a viscous liquid, fluidic, visco-elastic polymer mass (a "fluxed polymer") with a viscosity of 5000 to 6500 pascal-seconds at a shear of $150 \sec^{-1}$ and 190° C. Upon entering third zone (13) volatiles (including remaining moisture, entrained air, and other impurities) such as decomposition products are removed through first vacuum port (13V) which operates a negative pressure of less than 10 in-Hg, preferably less than 5 in-Hg. The purified fluxed polymer formed in third zone (13) and partially dried biofiber formed in first zone (11) are transferred into the fourth processor zone (14).

The region of the fourth processor zone where the fluxed polymer and biofiber process streams converge is of necessity a high free-volume region (14A) of the processor. Since the temperature of the entering biofiber is lower than that of the fluxed polymer, the overall temperature of incipient blend drops below its optimum processing temperature. Therefore, in fourth zone (14B) purified fluxed polymer and partially dried biofiber are mixed together, heated, and optionally compressed as the mix is conveyed through fourth zone regions of successively lower free-volume (14C). This mixing results in formation of an undispersed polymer-fiber mass. In the fourth processor zone (14C), this mass undergoes dispersive mixing and heating at a first set of predetermined temperature, pressure, and shear rate conditions. These conditions are sufficient to break-up most biofiber agglomerates, suspend or disperse biofiber throughout and encapsulate individual biofiber bundles within, a continuous phase of fluxed polymer. Furthermore, the predetermined conditions are sufficient to introduce fluxed polymer into the interior volume of biofiber cells thus forming a first compressed composite.

Applicants surmise that the bulk of the dispersive and distributive mixing occurs in zone (14C). At this high-temperature point in the process polymer viscosity is low, less than 6500 pascal-sec at a shear rate of $150 \sec^{-1}$ and 190° C., thus permitting intimate mixing and rapid and thorough desorption, release and removal of residual volatiles. The latent heat of vaporization of volatile products and endothermic induction phase of the PVC decomposition reaction absorbs part of the heat generated by the deformation mixing that takes place at this shear intensive phase of the process. This heat uptake limits the temperature rise and makes possible the use of higher shear and temperature conditions to increase throughput of the novel process. The high temperature, high shear process that takes place in zone (14C) is conducive to formation of volatile products that include HCl, terpenes (especially if the biofiber is derived from wood or paper) residual moisture (less than 1.5 wt.-% moisture, preferable less than 1wt.-% moisture preferably less than 8000 ppm moisture) in the composite and entrained air (not previously removed), decomposed stabilizer including dimethyl-tin-dichloride, low molecular weight fractions of lubricants, and any other material that is or becomes volatile at the instant conditions of temperature and pressure.

Upon entering fifth zone (15), first compressed composite abruptly expands and evaporatively cools, by at least 10°, preferably at least 15° C., due to evacuation of first volatile products through said second vacuum port (15V) thus forming a first expanded composite. In sixth zone (16), the first expanded composite is re-mixed, and simultaneously re-compressed, and re-heated under a second set of predetermined temperature, pressure, and shear rate conditions to ensure homogeneous redistribution of biofiber within the continuous polymer phase of the composite. Since the purpose of the mixing in sixth zone (16) is distributive, second mixing conditions are somewhat milder than first conditions in fourth zone (14C). Some dispersive mixing does occur, however, in the sixth zone. Upon re-homogenization, a second compressed composite is formed including second volatile products. Second volatile products include lower concentrations of moisture(less than 1wt.-% moisture preferably less than 8000 ppm moisture in the composite), terpenes, and entrained air and higher concentrations of decomposed stabilizer and lubricant. The concentration of HCl in second volatile products is below about 2 ppm based on the volume of effluent. Upon entering seventh processor zone (17), second compressed composite abruptly expands and evaporatively cools due to evacuation of second volatile products through third vacuum port (17V) thus forming a second expanded composite. In eighth processor zone (18) second expanded composite is compacted to form the desired dense thermoplastic biofiber composite material. The resulting dense composite has an apparent density greater than 70% of the theoretical maximum density and more than 50% of the biofiber interior cell volume has been filled with polymer during processing.

Figure 2:
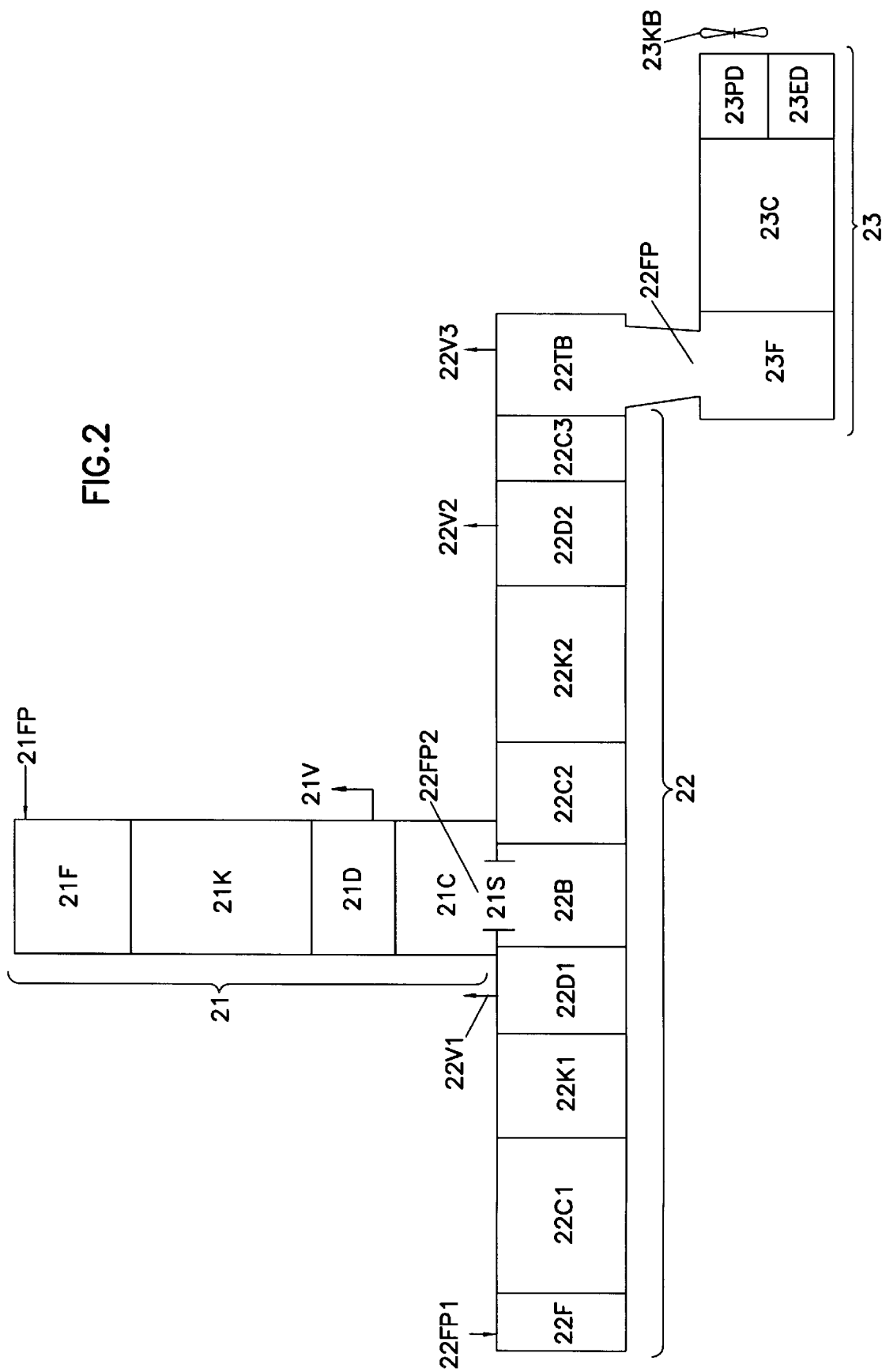
FIG. 2 shows a schematic diagram showing how three (3) extruders can be used to practice the inventive process.

FIG. 2 schematically shows a preferred process of the invention wherein three independently controlled screw extruders (21), (22), and (23) are configured to continuously produce dense thermoplastic-biofiber composite material. Each extruder is optimally sized with a screw design that allows the process as a whole to continuously operate at maximum throughput. This versatile combination of extruders produces dense composite quickly before significant PVC decomposition occurs. Biofiber is dried and optionally compressed in extruder (21), thermoplastic polymer resin is melted and polymer-biofiber composite formed in extruder (22), and dense composite is formed in compacting extruder (23). Consequently, extruder (21) performs the function generic processor zone one (11); extruder (22) performs the functions of generic processor zones two (12) through six (16); and extruder (23) performs the function of generic processor zone eight (18) as shown in FIG. 1. Extruders (21–23) also include various sub-zones (some being optional), which are described in detail in the following description of the process of FIG. 2.

Biofiber is fed to high free-volume feed mixing zone (21F) through biofiber feed port (21FP). The fiber is conductively heated and some moisture is volatized and passes out through fiber feed port (21FP) as fiber is conveyed through mixing zone (21F) it is further heated and optionally compressed to aid in the release and expulsion of moisture and entrapped air from the fiber mass. In high-shear kneading zone (21K), intensive mechanical working and further heating of biofiber occurs. Temperature, heat transfer, and shear are closely controlled in zones (21F & 21K) to optimize moisture vaporization without scorching, breaking, or piling (described in detail hereinafter) biofibers. When extruders are used to practice the novel process, an object of the invention is to reduce vent flow (also known as "geysering" or "piling"). Increasing process throughput requires increasing the feed rates of the components. If the bulk density of one of the components is low, such as biofiber, problems arise in feeding material to the extruder screw(s) at the required rate. If high levels of volatiles (moisture) are introduced with the fiber, the pressure generated in the extruder can blow fiber out through the vent and vacuum ports. These various vent flow problems are aggravated when the densified composite material contains higher amounts of fiber, i.e. more than 50 wt %. Clearly the step devolatilization processes described by Rauwendall, supra, for single screw extruders are inadequate to handle the severe vent flow that accompany the high throughput processes of the present invention as practiced on co-rotating, twin screw extruders. Accordingly, a feature of applicant's invention involves pre-drying and the compacting or compressing the biofiber in ways that do not fracture or degrade sensitive fiber morphology prior to its introduction into the inventive process. Applicants envision accomplishing these unit operations by using the drier as described by Dennis Jr. Et al., in U.S. Pat. No. 4,37,375 or counter-current circulating inert gas fluidized bed technology. The use of "stuffers" or related hardware/equipment to compact or compress the dried biofiber to increase its bulk density prior to feeding it into the fused/molten thermoplastic is also envisioned When extruders are used to form the densified composite material delivered by the novel process, the overall viscous energy dissipated per kilogram of extrudate is specific mechanical energy (SME) required to fuse the resin and accomplish the molecular orientation and wetting processes required to transform the resin-fiber blend into densified composite material. A high throughput continuous process efficiently converts the maximum available mechanical energy into composite. However, the densification processes further require delivery of the energy at a rate sufficient to overcome the energy barriers opposing densification. Therefore the SME must be delivered by the process at a shear rate and for a time sufficient to force thermoplastic into the biofiber cell interior without breaking acicular fibers (or otherwise commuting/degrading the biofiber size distribution). Scanning electron photomicrographs show the desired thermoplastic fiber-filled morphology characterizing the densified composite material as opposed to the collapsed, unfilled structure that is to be avoided.

While the torque exerted on acicular fibers by shear gradients tend to rotate them in the flow direction thus producing a more aligned morphology that generally improves the mechanical properties of the resulting aligned composite, the torque can easily exceed that required to break the fiber. Therefore, when the input fiber is highly acicular the shear rate, and/or the time spent by the material, in the mixing zone is reduced to prevent excessive particle breakage.

As described in more detail below the shear rate—residence time distribution in twin screw extruders is complex; however, an approximation of limiting values for these parameters can be ascertained from Brabender Fusion Bowl analyses of the representative input thermoplastic-biofiber fiber blends.

In co-rotating, twin screw extruders preferred for practicing the invention, the shear rate and residence time spent by extrudate in the high shear (generally the kneading) zones of the extruder is a complex interactive function of screw rotation speed (RPM) and extruder screw/barrel geometry. However, the following general observations are relevant:

For a given geometry the shear rate increases in direct proportion to screw speed and narrowing of the clearance between the tips of various screw elements and the extruder barrel (affected by the degree of wear);

The residence time spent by the extrudate in the high shear zone is determined by the degree of fill of the extruder screw and the following interactive geometrical factors: 1) the width of the narrow clearance zone (the number and width of kneading block elements used in the screw design), 2.) the number of lobes on the screw elements-(increasing number of lobes increases the volume of material in the narrow clearance zone while simultaneously reducing the free volume of lower shear zone between the tip and root of the screw element); and 3.) the number and type of reverse (left-handed) elements included in the screw design).

Heated biofiber is conveyed to vent zone (21D) where the bulk of the moisture is vented through vent (21V). Fiber moisture content is typically in the range of from 3 to 5% as it is conveyed into compression zone (21C).

Thermoplastic polymer resin including poly (vinylchloride), enters high free-volume mixing zone (22F) through resin feed port (22FP1) where it is conductively heated to at least 165° C. by contact with internal processing surfaces, to form a fluxed polymer. Polymer can be more expeditiously melted by including optional melt-compression zone (22C1) and optional melt-plastication zone (22K1) where polymer is further heated to 170° C. and respectively compressed, and kneaded under high shear conditions. Upon entering optional vacuum devolatilization mixing zone (22D1) volatiles (including moisture, entrained air, and impurities) and decomposition products are evacuated through first vacuum port (22V1) which operates a negative pressure of from 0.1 to 100 kilopascals, preferably 2 to 35 kilopascals, and most preferably from 3 to 30 kilopascals to form a purified fluxed polymer. When vacuum is applied to port (22V1) devolatilization zone (22D1) must be isolated in a pressure wise manner from feed port (22FP1) by forming a melt seal in at least one of zones (22F, 22C1, or 22K1). The purified melt is conveyed by the screw of extruder (22) directly into high free volume conveying zone (22B).

Partially dried biofiber and optional re-grind exiting extruder (21) enter extruder (22) through fiber feed port (22FP2) which is optionally equipped with stuffer (21S) to promote smooth flow and rapid incorporation of biofiber into the viscous fluxed polymer as it enters high-free volume blending zone (22B) wherein fluxed polymer and biofiber are blended to form a fluxed polymer-like mixture. In compression zone (22C2), fluxed polymer is compressed, sheared, and further heated to a temperature in the range of from 170 to 215° C., more preferably 180 to 210° C., and most preferably 195 to 205° C. and a pressure of from 1to 100 Kilo-pascals to encapsulate biofiber and introduce polymer into the interior volume of biofiber cells to form composite material. The densification process taking place in zone (22C2) can be expedited by including optional kneading zone (22K2) to increase the high shear mixing and masticating processes required to densify fluxed polymer and form compressed composite.

The compressed composite abruptly expands and cools at least by 10° C. or greater such that any thermal decomposition is quenched. The material is cooled below 195° C. preferably 190° C. as it passes through vacuum devolatilization mixing zone (22D2) thus quenching PVC decomposition reactions initiated in high temperature zones (22C2 & 22K2). Expanding volatile products are vented through vacuum port (22V2) under a vacuum of sufficient strength to remove volatile products from the composite but of insufficient strength to pull the composite apart (a condition which promotes biofiber piling). Suitable negative operating pressures for vacuum port (22V2) are in the range of from 1 to 100 kilopascals, preferably 5 to 40 kilopascals, and more preferably 15 to 35 kilopascals.

The volatile products removed from the expanded composite at vacuum port (22V2) contain, among other things, residual traces of moisture, terpene hydrocarbons, reacted stabilizer, HCl, low molecular weight fractions of lubricants and optional addenda described in further detail hereinafter. The expansion and evacuation of volatiles is non-uniform and results in some degree of stratification of the expanded composite. Therefore, as expanded composite enters re-compression zone (22C3) it must be re-mixed and simultaneously recompressed and reheated to ensure homogeneous redistribution of biofiber within the continuous polymer phase of the composite. The redensified composite abruptly discharges, into transition box (22TB). The second dense composite now free of the confines of the extruder screw(s) is free to expand and cool in three dimensions. This expansion is sufficiently violent that some of the remaining, unruptured biofiber cells that have become steam filled during processing explode thus opening their interior volumes; for subsequent introduction of fluxed polymer. Newly formed and residual volatile products confined by the screw (s) in devolatilization mixing zone (22D2) are evacuated through vacuum port (22V3) operating under a negative pressure in the range of from 50 to 95 kilopascals, preferably 55 to 90 kilopascals, and more preferably 60 to 80 kilopascals. Generally vacuum port (22V3) operates at a higher negative pressure than vacuum port (22V2) to remove higher molecular weight or lower concentrations of decomposition products and to avoid fiber piling in port (22V2). The ratio of the pressure applied to port (22V3) to that applied to port (22V2) is in the range of from 1.0 to 20, preferably 2 to 15, and more preferably from 3 to 7.

After passing through transition box (22TB), the expanded composite enters compacting extruder feed zone (23F) through feed port (23FP) where it is re-mixed, and recompressed, and heated in compression zone (23C) to about 175° C. The pressure induced in zone (23C) is sufficient to extrude composite material through profile extrusion die (23ED) or pelletizing die (23PD). Therefore, the interiors of the cells opened during expansion in transition box (22TB) readily fill with polymer in passing through compacting extruder (23) to form the desired dense thermoplastic-biofiber composite material produced by the inventive process.

For the sake of completeness, FIG. 2 shows attachment of the following optional components to receive and further process the discharge of compacting extruder (23) described in greater detail hereinafter. The optional components are: pelletizing die (23PD), cutter (23KB), additive mixing zone (23F2) including at least one additive feed port (23FP2), optional compression mixing zone (23C2); and profile extrusion die (23ED) which is further optionally adapted to coextrude capstock(s) on predetermined areas of the extruded profile external surface.

In a further simplification of the process disclosed above and shown in FIG. 2, two melt-plasticating extruders (22) and (23) are used to practice the inventive continuous process at throughput rates substantially higher than those of the prior art. In this embodiment of the invention, biofiber drying extruder (21) is omitted and the process steps that take place therein are moved to corresponding resin melting zones of extruder (22).

Figure 3:
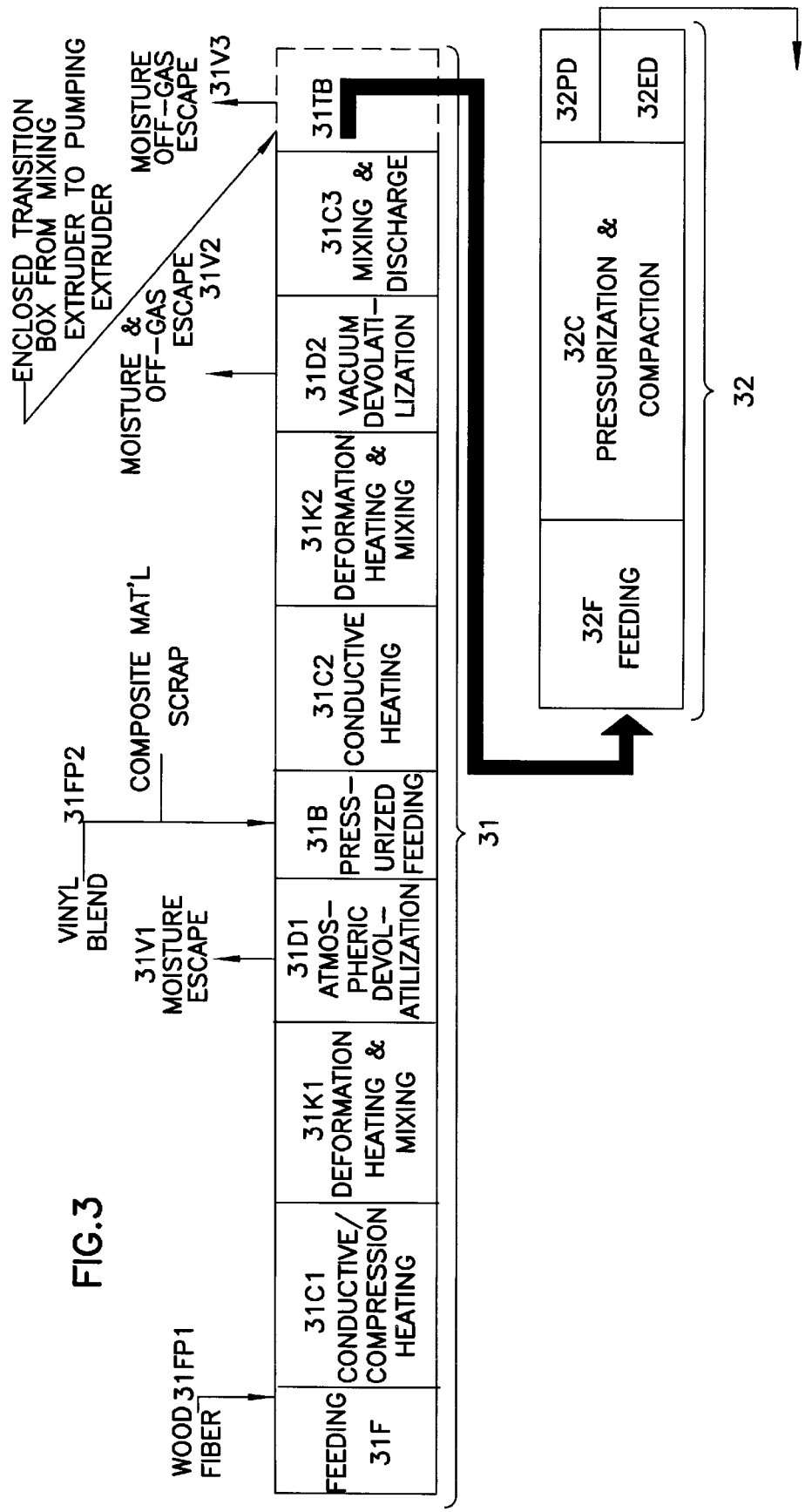
FIG. 3 shows a schematic diagram showing how two (2) extruders can be used to practice the inventive process.

FIG. 3 schematically shows the details of this two-extruder process. Biofiber is charged though feed port (31FP1) to feed zone (31F) were it is conductively heated to 100° C. Eleated fiber is optionally compressed in mixing zone (31C1), optionally kneaded in (31K1). The temperature profile in zones (31F, 31C1, & 31K1) is adjusted to heat biofiber to a temperature exceeding 100° C. to partially volatilize moisture, which is vented in zone (31D1) through vent port (31I). Partially partially dried biofiber exits vent zone (31D1) and enters blending zone (31B) uncompressed in this embodiment of the invention. Thermoplastic resin including PVC blend and optional amounts of previously dried regrind are pre-blended and are charged to blend mixing zone (31B) through feed port (31FP2) where resin is dry blended with biofiber entering blending zone (31B) from vent zone (31D1). The free volume in the blending zone (31B) is relatively high to accommodate smooth flow and blending partially dried biofiber and resin/regrind. The dry blend undergoes increasing conductive heating as it passes through blend zone (31B) to 170° C. Initially solid phase distributive mixing of biofiber and resin occurs. As the mixture passes through blend zone (31B) and optional compression zone (31C2), resin progressively fuses and mixes with biofiber. Upon entering high-shear mixing in kneading zone (31K2) intensive dispersive and distributive mixing occurs as described above to form first compressed composite material. From this point onward, extruder configuration and processing are identical to that disclosed for the process of FIG. 2. Applicants observed that by applying vacuum to vacuum ports (31V2) and (31V3) they can lower the melt temperature of expanded composite in the transition box (31TB) by up to 10° C. Once this temperature drop occurs screw speed and material feed rates can be increased to increase process throughput above the levels of prior art processes.

Figure 4:
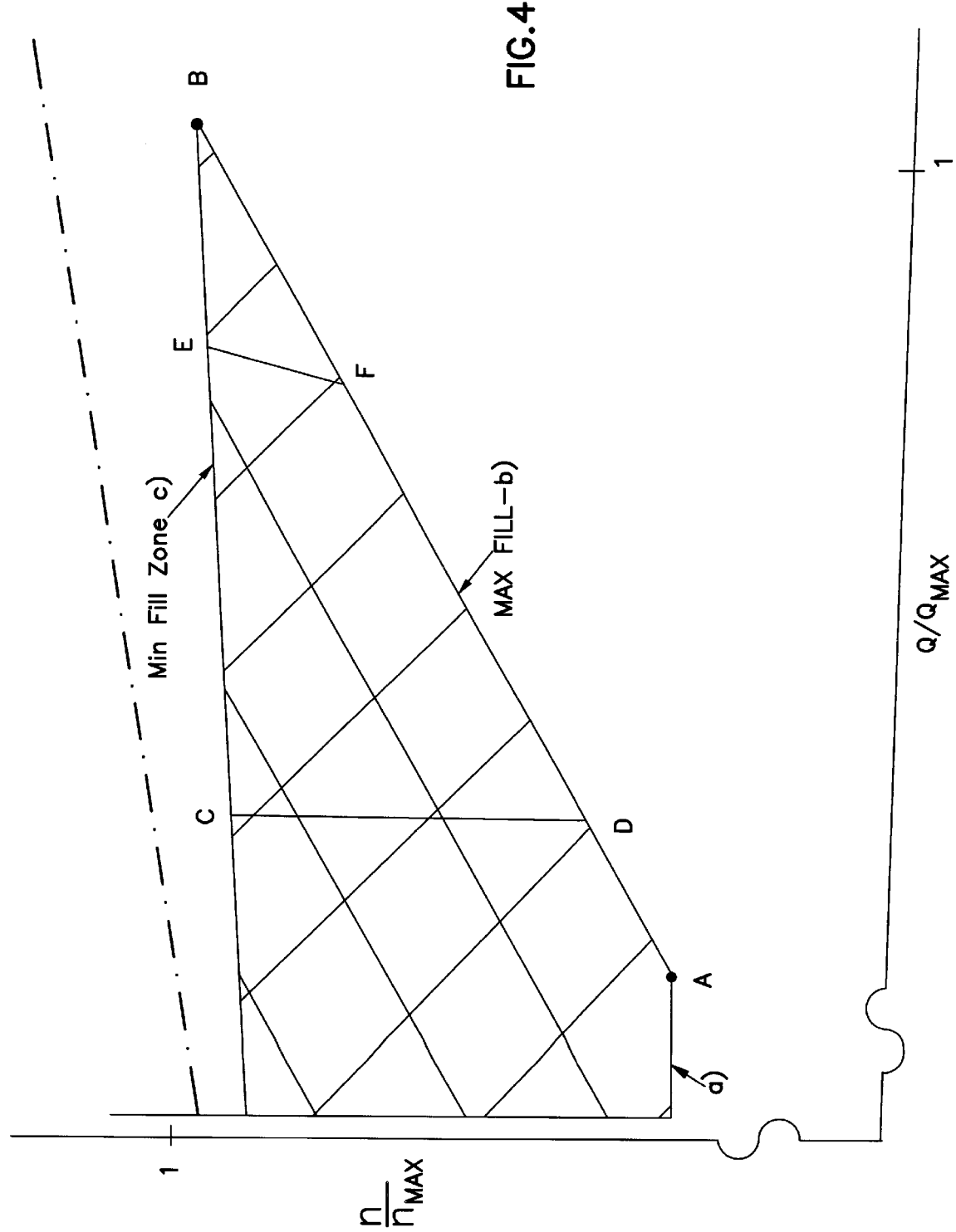
FIG. 4 is plot of relative throughput (abcissa) versus relative screw rotation (ordinate) for two-extruder embodiment of the inventive process shown schematically in FIG. 3 showing the crosshatched inventive process operating "window".

FIG. 4 is a plot of relative throughput (abcissa) versus relative screw rotation (ordinate) prepared from the data shown in Table I. The shaded region defines the operating limits of the novel process. We have determined that within the "process window", the specific mechanical energy (SME) delivered to at least 280 kJ–kg$^{-1}$, preferably 340 to 500 kJ–kg$^{-1}$, the materials charged to the extruder is above the minimum level required to form the dense composite material, i.e., introduce polymer into cell interiors. We have found that at point A at the intersection of line segments a) and b) defines the lower bound of the process window. Below a) insufficient shear energy is delivered to the resin-fiber blend to melt the resin (in extruder embodiments of the invention, the feed and screw rotation rates may be insufficient to form a melt seal anywhere in the extruder barrel) sufficiently to form a composite with fiber. In our experiments, the throughput rates to the right of b)(the maximum fill line) exceed the power requirements of the processor. For extruders the torque limit for the screw(s) is exceeded and the screw(s) "jams". Therefore, for purposes of this invention, point A defines the minimum specific mechanical energy (MSME), i.e., processor power consumed divided by throughput at point A.

Correspondingly, point B, for purposes of this invention defines the maximum throughput point on line segment b),i.c., maximum processor power divided by MSME (defined by point A). Above line segment c) the SME exceeds the minimum required to decompose PVC. In this "minimum fill zone" of FIG. 4, the feed to the extruder screw(s) is insufficient to absorb all the mechanical shear energy supplied by the screw(s) and the excess heats fluxed polymer above the decomposition temperature of PVC (a temperature generally accepted to be above 195° C.–215° C. Since in some product applications small amounts of decomposition are acceptable, the upper boundary of the process window, line segment c) is somewhat "fuzzy". However, above broken line segment d) PVC decomposition and crosslinking is well underway. The expected rapid rise viscosity and corresponding increase in screw torque will quickly jam the extruder.

In FIG. 4, the location and slope of line segments a), b) and c) are defined by processor parameters. In the case of extruder screw(s): design, diameter, & length. In addition, the slopes and location of segments a) and c) are affected by material parameters such as moisture, stabilizer type and concentration.

Figure 5:
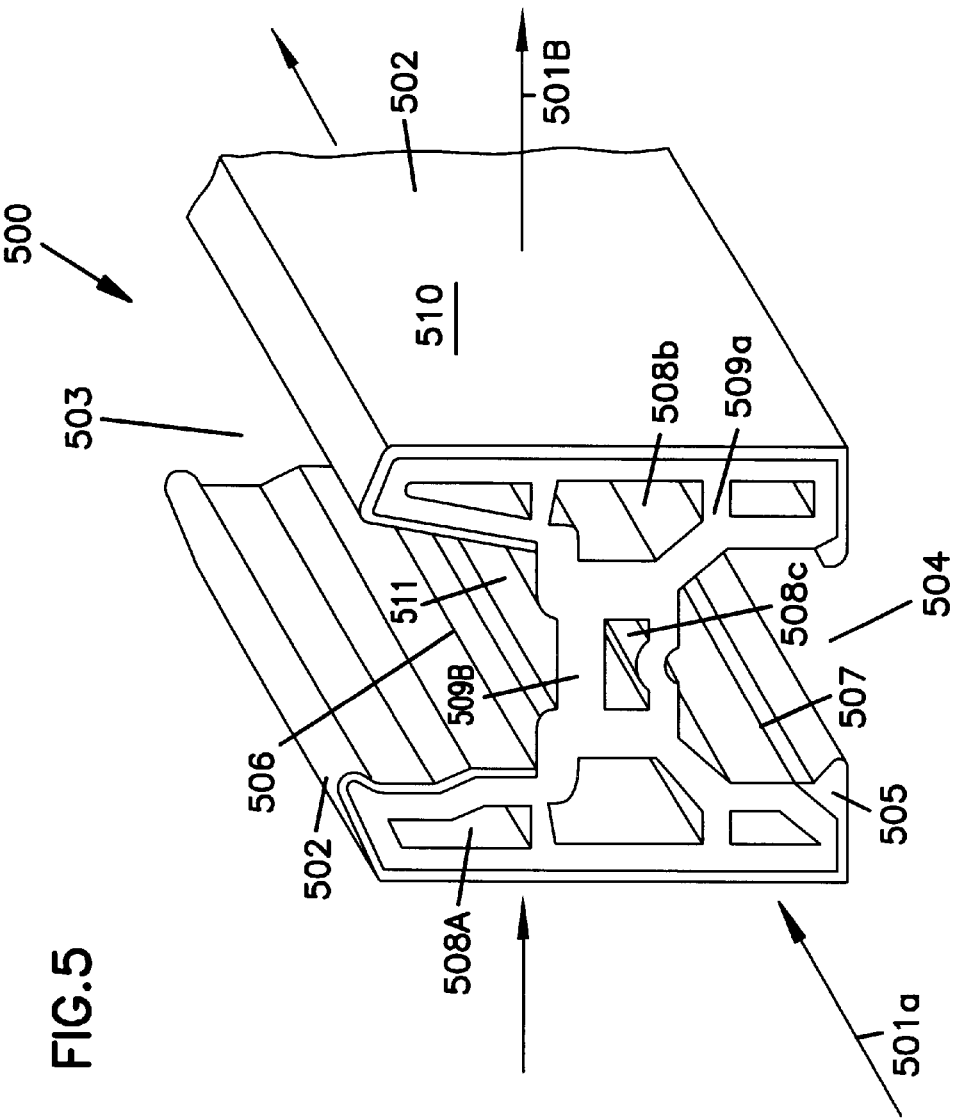
FIG. 5 shows a portion of a extruded complex hollow profile for a window sash. The sash is an extruded polymer wood fiber composite having a capstock. The sash has at least two support directions, one for gravity and a second for wind load. The profile comprises a complex external surface features, for glazing and frame, and a complex internal structure.

FIG. 5 shows a cross-section of an extruded sash profile 500. The complex hollow profile has a complex surface feature or features, is covered with a capstock 502 coextruded onto the exterior of the profile 500 on all exposed or visible surfaces. The interior surface 510 contains the capstock 502 layer. In a window sash, the common loads experienced by the sash is a load caused by the force of gravity and a separate important load caused by wind loadings. The support direction of the wind load 501b and the support direction for the gravity load 501a is exerted onto the profile. The extruded profile 500 is used in the manufacture of sash window structures by incorporating a glass unit into a surface feature comprising a window location 503 wherein it is adhesively installed. The sash is installed in a frame in which the sash can move vertically on a frame guide. The sash is inserted on the frame guide (not shown) using a surface feature comprising a sash area 504 and weatherstrip 505 to form a weather-tight sliding area. The capstock 502 is not extruded to cover the entirety of the profile. The uncovered composite material 511 is shown on the profile with no capstock layer. The edge 506 of the capstock 502 covers the composite material 511 but reveals the composite material at an edge 506 or 507. The hollow profile is made with internal hollow areas 508a, 508b and 508c within the profile defining the dimension of the thin walled hollow profile structure 500. The hollow profile additionally comprises support webs 509a and 509b within the profile 500 providing support in the wind load direction.

Description of useful thermoplastic polymer blends suitable for practicing the inventive process.

Poly(vinylchloride) Homopolymer, Copolymers and Polymeric Alloys

Poly(vinylchloride) is a common commodity thermoplastic polymer. Vinyl chloride monomer is made from a variety of different processes such as the reaction of acetylene and hydrogen chloride and the direct chlorination of ethylene. Poly(vinylchloride) is typically manufactured by the free radical polymerization of vinyl chloride resulting in a useful thermoplastic polymer. After polymerization, poly (vinylchloride) is commonly combined with thermal stabilizers, lubricants, plasticizers, organic and inorganic pigments, fillers, biocides, processing aids, flame retardants and other commonly available additive materials. Poly (vinylchloride) can also be combined with other vinyl monomers in the manufacture of poly(vinylchloride) copolymers. Such copolymers can be linear copolymers, branched copolymers, graft copolymers, random copolymers, regular repeating copolymers, block copolymers, etc. Monomers that can be combined with vinyl chloride to form vinyl chloride copolymers include a acrylonitrile; alpha-olefins such as ethylene, propylene, etc.; chlorinated monomers such as vinylidene dichloride, acrylate momoners such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

Such monomers can be used in an amount of up to about 50 mol-%, the balance being vinyl chloride. Polymer blends or polymer alloys can be useful in manufacturing the pellet or linear extrudate of the invention. Such alloys typically comprise two miscible polymers blended to form a uniform composition. Scientific and commercial progress in the area of polymer blends has lead to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature ($T_g$). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semicrystalline), the thermodynamic state of the blend, and its mechanical state whether molecules and phases are oriented Poly (vinylchloride) forms a number of known polymer alloys including, for example, poly(vinylchloride)/nitrile rubber; poly(vinylchloride) and related chlorinated copolymers and terpolymers of poly(vinylchloride) or vinylidene dichloride poly(vinylchloride)/alphamethyl styrene-acrylonitrile copolymer blends, poly(vinylchloride)/polyethylene; poly (vinylchloride)/chlorinated polyethylene and others.

The primary requirement for the substantially thermoplastic polymeric material is that it retain sufficient thermoplastic properties to permit flux melt blending with wood fiber, permit formation of linear extrudate pellets, and to permit the composition material or pellet to be extruded or injection molded in a thermoplastic process forming the rigid structural member. Poly(vinylchloride) homopolymers copolymers and polymer alloys are available from a number of manufacturers including B.F. Goodrich, Vista. Air Products, Occidental Chemicals, etc. Preferred poly(vinylchloride) materials are poly(vinylchloride) homopolymer having a molecular weight of about 90,000±50,000, most preferably about 88,000±10,000.

Resin particle flake or pellet sizes should be in the range of from 0.1 to 10 mm preferably 0.5 to 5 mm, to facilitate processing as taught in U.S. Pat. No. 5,536,462 (Hawrylko, GEON Co.-*High Output Twin Screw Extrusion Process*). A suitable material for inclusion in the polymer blend charged to processors used to practice the novel process is described in U.S. Pat. No. 5,712,319 (Suzuki et al.; Shin-Etsu Chem. *Resin Compositions for Low Expansion Moldings*), which is hereby incorporated by reference PVC stabilizers are described and their reaction mechanisms diagramed by N. Grassie & G. Scott, *Polymer Degradation and Stabilisation*, p. 152. Other addenda include, but are not limited to, lubricants, pigments, fillers, UV stabilizers, and low levels of synthetic fibers such as glass, carbon, polyamide. etc.

Suitable biofibers for practicing the inventive process may be derived from any number of available sources such as ground wood, sawdust, wood flour, ground newsprint, magazines, books, cardboard, wood pulps (mechanical, stone ground, chemical, mechanical-chemical, bleached or unbleached, sludge, waste fines), and various agricultural wastes (rice hulls, wheat, oat, barley and oat chaff, coconut shells, peanut shells, walnut shells, straw, corn husks, corn stalks, jute, hemp, bagasse, bamboo, flax, and kenaff). The resin component may also comprise virgin or recycled (waste) thermoplastics derived from the polyolefin family (polyethylenes, polypropylenes and copolymers thereof, vinyls (chiefly copolymers of vinyl chloride), and styrenics (including ABS and maleic anhydride copolymers thereof) and in some cases, mixtures of such polymers. Since PVC degradation and crosslinking take place at temperatures above 220° C., resins which must be processed above this limiting temperature are generally excluded. Thus, a majority of the so-called engineering resins may not be employed in the process of the invention, since their softening temperatures are too high and would exceed 220° C.

Wood fiber, in terms of abundance and suitability can be derived from either soft woods or evergreens or from hard woods commonly known as broad leaf deciduous trees. Soft woods are generally preferred for fiber manufacture because the resulting fibers are longer, contain high percentages of lignin arid lower percentages of hemicellulose than hard woods. While soft wood is tie primary source of fiber for the invention, additional fiber make-up can be derived from a number of secondary or fiber reclaim sources including bamboo, rice, sugar cane, and recycled fibers from newspapers, boxes, computer printouts, etc.

However, the primary source for wood fiber of this invention comprises the wood fiber by-product of sawing or milling soft woods commonly known as sawdust or milling tailings. Such wood fiber has a regular reproducible shape and aspect ratio. The fibers based on a random selection of about 100 fibers are commonly at least 0.1 mm in length, at least 0.01 mm in thickness and commonly have an aspect ratio of at least 1.8. Preferably, the fibers are 0.2 to 10 mm in length, 0.02 to 1.5 mm in thickness with an aspect ratio between 2 and 7, preferably 2.5 to 6.0. The preferred fiber for use in this invention is fibers derived from processes common in the manufacture of windows and doors. Wooden members are commonly ripped or sawed to size in a cross grain direction to form appropriate lengths and widths of wood materials. The by-product of such sawing operations is a substantial quantity of sawdust. In shaping a regular shaped piece of wood into a useful milled shape, wood is commonly passed through machines which selectively removes wood from the piece leaving the useful shape. Such milling operations produce substantial quantities of sawdust or mill tailing by-products. Lastly, when shaped materials are cut to size and mitered joints, butt joints, overlapping joints, mortise and tenon joints are manufactured from pre-shaped wooden members, substantial waste trim is produced. Such large trim piece are commonly cut and machined to convert the larger objects into wood fiber having dimensions approximating sawdust or mill tailing dimensions. The wood fiber sources of the invention can be blended regardless of particle size and used to make the composite. The fiber stream can be pre-sized to a preferred range or can be sized after blending. Further, the fiber can be pre-pelletized before use in composite manufacture.

Such sawdust material can contain substantial proportions of waste stream by-products. Such by-products include waste poly(vinylchloride) or other polymer materials that have been used as coating, cladding or envelope on wooden members; recycled structural members made from thermoplastic materials; polymeric materials from coatings; adhesive components in the form of hot melt adhesives, solvent based adhesives, powdered adhesives, etc.; paints including water based paints, alkyd paints, epoxy paints, etc.; preservatives, anti-fungal agents, anti-bacterial agents, insecticides, etc., and other waste streams resulting from the manufacture of wooden doors and windows. The to waste stream content of the wood fiber materials is commonly less than 25 wt-% of the total wood fiber input into the poly (vinylchloride) wood fiber product. Of the total waste recycle, approximately 10 wt-% of that can comprise a vinyl polymer commonly poly(vinylchloride). Commonly, the intentional recycle ranges from about 1 to about 25 wt-%, preferably about 2 to about 20 wt-%, most commonly from about 3 to about 15 wt-% of contaminants based on the sawdust.

Capstocks suitable for extrusion on pre-selected regions of the profile exterior surface include, but are not limited to, Duracap from GEON; Geloy® from GE Plastics, Centrex® from Bayer, Lucite® TuffCoat™ from ICI Acrylics Incorporated; and Kydex® from Kleerdex Company.

Pellet

The poly(vinylchloride) and wood fiber can be combined and formed into a pellet using thermoplastic extrusion processes, wood fiber can be introduced into pellet making process in a number of sizes. We believe that the wood fiber should have a minimum size of length and width of at least 1 mm because Wood flour tends to be explosive at certain wood to air ratios. Further, wood fiber of appropriate size of a aspect ratio greater than 1 tends to increase the physical properties of the extruded structural member. However, useful structural members can be made with a fiber of very large size. Fibers that are up to 3 cm in length and 0.5 cm in thickness can be used as input to the pellet or linear extrudate manufacture process. However, particles of this size do not produce highest quality structural members or maximized structural strength. The best appearing product with maximized structural properties are manufactured within a range of particle size as set forth below. Further, large particle wood fiber an be reduced in size by grinding or other similar processes that produce a fiber similar to sawdust having the stated dimensions and aspect ratio. One further advantage-of manufacturing sawdust of the desired size is that the material can be pre-dried before introduction into the pellet or linear extrudate manufacturing process. Further, the wood fiber can be pre-pelletized into pellets of wood fiber with small amounts of binder if necessary.

During the pelletizing process for the composite pellet, the poly(vinylchloride) and wood fiber are intimately contacted at high temperatures and pressures to insure that the wood fiber and polymeric material are wetted, mixed and extruded in a form such that the polymer material, on a microscopic basis, coats and flows into the pores, cavity, etc., of the fibers. The fibers are preferably substantially oriented by the extrusion process in the extrusion direction. Such substantial orientation causes overlapping of adjacent parallel fibers and polymeric coating of the oriented fibers resulting a material useful for manufacture of improved structural members with improved physical properties. The degree of orientation is about 20%, preferably 30% above random orientation which is about 45 to 50%, said orientation are percents above the normal orientation. The structural members have substantially increased strength and tensile modulus with a coefficient of thermal expansion and a modulus of elasticity that is optimized for window and doors. The properties are a useful compromise between wood, aluminum and neat polymer.

Moisture control is an important element of manufacturing a useful linear extrudate or pellet. Depending on the equipment used and processing conditions, control of the water content of the linear extrudate or pellet can be important in forming a successful structural member substantially free of internal voids or surface blemishes. The concentration of water present in the sawdust during the formation of pellet or linear extrudate when heated can flash from the surface of the newly extruded structural member and can come as a result of a rapid volatilization, form a steam bubble deep in the interior of the extruded member which can pass from the interior through the hot thermoplastic extrudate leaving a substantial flaw. In a similar fashion, surface water can bubble and leave cracks, bubbles or other surface flaws in the extruded member.

Trees when cut depending on relative humidity and season can contain from 30 to 300 wt-% water based on fiber content. After rough cutting and finishing into sized lumber, seasoned wood can have a water content of from 20 to 30 wt-% based on fiber content. Kiln dried sized lumber cut to length can have a water content typically in the range of 8 to 12%, commonly 8 to 10 wt-% based on fiber. Some wood source, such as poplar or aspen, can have increased moisture content while some hard woods can have reduced water content.

Because of the variation in water content of wood fiber source and the sensitivity of extrudate to water content control of water to a level of less than 8 wt-% in the pellet based on pellet weight is important. Structural members extruded in non-vented extrusion process, the pellet should be as dry as possible and have a water content between 0.01 and 5%, preferably less than 3.5 wt-%. When using vented equipment in manufacturing the extruded linear member, a water content of less than 8 wt-% can be tolerated if processing conditions are such that vented extrusion equipment can dry the thermoplastic material prior to the final formation of the structural member at the extrusion head.

The pellets or linear extrudate of the invention are made by extrusion of the poly(vinylchloride) and wood fiber composite through an extrusion die resulting in a linear extrudate that can be cut into a pellet shape. The pellet cross-section can be any arbitrary shape depending on the extrusion die geometry. However, we have found that a regular geometric cross-sectional shape can be useful. Such regular cross-sectional shapes include a triangle, a square, a rectangle, a hexagonal, an oval, a circle, etc. The preferred shape of the pellet is a regular cylinder having a roughly circular or somewhat oval cross-section. The pellet volume is preferably greater than about 12 $mm^3$. The preferred pellet is a right circular cylinder, the preferred radius of the cylinder is at least 1.5 mm with a length of at least 1 mm. Preferably, the pellet has a radius of 1 to 5 mm and a length of 1to 10 mm. Most preferably, the cylinder has a radius of 2.3 to 2.6 mm, a length of 2.4 to 4.7 mm, a volume of 40 to 100 mm$^3$, a weight of 40 to 130 mg and a bulk density of about 0.2 to 0.8 gm/mm$^3$.

We have found that the interaction, on a microscopic level, between the polymer mass and the wood fiber is an important element of the invention. We have found that the physical properties of an extruded member are improved when the fluxed polymer during extrusion of the pellet or linear member thoroughly wets and penetrates the wood fiber particles. The thermoplastic material comprises an exterior continuous organic polymer phase with the wood particle dispersed as a discontinuous phase in the continuous polymer phase. The material during mixing and extrusion obtains an aspect ratio of at least 1.1 and preferably between 2 and 6, optimizes orientation such as at least 20 wt-%, preferably 30% of the fibers are oriented in an extruder direction and are thoroughly mixed and wetted by the polymer such that all exterior surfaces of the wood fiber are in contact with the polymer material. This means, that any pore, crevice, crack, passage way, indentation, etc., is fully filled by thermoplastic material. Such penetration as attained by ensuring that the viscosity of the fluxed polymer is reduced by operating at elevated temperature and the use of sufficient pressure to force the polymer into the available internal pores, cracks and crevices in and on the surface of the wood fiber.

During the pellet or linear extrudate manufacture, substantial work is done in providing a uniform dispersion of the wood into the polymer material. Such work produces a fluid composite material that when extruded into a final structural member, permits the orientation of the fiber in the structural member to be increased in the extruder direction resulting in improved structural properties. The pellet dimensions are selected for both convenience in manufacturing and in optimizing the final properties of the extruded materials. A pellet with dimensions substantially less than the dimensions set forth above is difficult to extrude, pelletize and handle in storage. Pellets larger than the range recited are difficult to introduce into extrusion or injection molding equipment, and are difficult to melt and form into a finished structural member.

As shown in FIG. 2, optional materials can ben blended with dense composite at feed port (23FP2) to modify the properties of structural members prior to extrusion. These include, but are not limited to, blowing agents, pigments, fillers, UV stabilizers, lubricants, and the like. These can be mixed into dense composite in mixing zone (23M) to form an extrudable mass, which is heated and compressed in compression zone (23C2) to a temperature and pressure suitable for feeding extrusion die (23DE).

Foaming

Foamed thermoplastic composites are typically made by dispersing or expanding a gaseous phase throughout the fluxed polymer phase to create a foam comprising a polymer component and a included gas component in a closed or open structure. The preservation of the resultant foamed state is important to maintaining the desired structural properties. The most common process involves an expansion of foamed thermoplastic materials. The expansion process typically involves three steps. First, small discontinuities or cells are created in a fluid or plastic phase. These discontinuities are grown to desired volume to produce a cell structure. The cell structure is then stabilized by physical (cooling) or chemical (crosslinking) means to form the resultant foamed or cellular polymer structure.

Virtually all thermoplastic foams are blown with inert gas foaming agents or decomposing chemical blowing agents. Such agents commonly foam using inert gases Stitch as nitrogen or carbon dioxide, hydrocarbons containing3 to 5 carbon atoms, chlorinated hydrocarbons and chlorofluorocarbons such as CFC-11, CFC-12, CFC-113, CFC-114. Chemical blowing agents operate by decomposition at elevated temperatures to an inert gas. Physical blowing agents operate by dissolving or dispersing in the plastic or melt polymer liquid phase and as pressure is released, flashing into the gaseous state creating the growth of the cellular structure. In the application of this invention, the preferred blowing agents are conventional diazo blowing agents which on decomposition yield nitrogen, an effective inert blowing agent that creates a cellular structure throughout the polymeric/biofiber composite material. More specifically, blowing agents that can be used in the process of the invention include chemical blowing agents such as organic or inorganic bicarbonates or oxylates, azo-chemicals, hydrozides, and amine nitrates. Low boiling liquids which can produce gas by vaporization in lower pressure zones include carbon dioxide, aliphatic hydrocarbons such as propane, butane, pentane and isomers thereof. Chlorinated and fluorinated hydrocarbons such as methylene chloride, dichloro-difluoromethane and monochlorotrifluoromethane are useful. Such blowing procedures are a well known process understood by one of ordinary skill in the art. Careful control of the blowing agent addition and extrusion temperature is necessary to insure that foaming occurs in the correct time and place and blowing agent is not wasted. When foaming agents are added to dense composite at feed port (23FP2), greater control of temperature, pressure and residence time in subsequent mixing and compression zones (23M & 23C2) is required. Suitable extrusion conditions are described for the foamed mull casing of Example 2.

Description of Suitable Processors, Extruders (co, counter, single, and twin), and Screw Designs.

Processors useful for practicing the inventive process must be capable of continuously executing the following unit operations in rapid succession: 1.) (compression/shear) fluxed polymer mixing, 2.) pressurized feed of pre-dried bio fiber to a high free volume distributive mixing zone where low viscosity polymer is blended with biofiber, 3) compression of the blend, 4) deformation mixing in a dispersive mixing zone, 5) decompression and cooling of the composite, and 6) venting of residual moisture and volatiles capable of auto-catalyzing the decomposition reaction. Suitable processors must have means for continuously transporting materials between zones where these unit operations are performed. The materials conveyed between zones include particulate solids, viscous fluxed polymer, and fluxed polymer-like mixtures. Particulate solids include, for example, biofiber, reinforcing synthetic fibers (such as glass, nylon, & graphite), high molecular weight polymer resins (like poly(vinylchloride), low molecular weight resins (stabilizers, lubricants, impact modifiers, & compatiblizers) and pigments (such as alpha-titanium dioxide & carbon black), fillers (such as mica & talc) etc.

Suitable processors for practicing the novel process include, but are not limited to continuous process high shear mixers such as: industrial melt-plasticating extruders, available from a variety of manufacturers including, for example, Cincinnati-Millicron, Krupp Werner & Pfleiderer Corp., Ramsey, N.J. 07446. American Leistritz Extruder Corp.; Somerville, N.J. 08876; Berstorff Corp., Charlotte, N.C.; and Davis-Standard Div. Crompton & Knowles Corp., Pawcatuck, Conn. 06379. Kneeders are available from Buss America, Inc.; Bloomington, Ill.; and high shear mixers alternatively known as Gelimat™ available from Draiswerke G.m.b.H., Mamnheim-Waldhof, Germany; and Farrel Continuous Mixers, available from Farrel Corp., Ansonia, Conn. The screw components used for mixing, heating, compressing, and kneading operations are shown and described in Rauwendaal, *Polymer Extrusion*, supra Chapter 8 and pages 458–476; Meijer et al., supra, pages 282–284.

The inventive process unit operations can be accomplished using wide ranging extruder barrel and screw configurations. The knowledge necessary to select extruder barrel elements and assemble twin co-rotating extruder screws is readily from various extruder suppliers and is well known to those of ordinary skill in the art of fluxed polymer plastication. Vacuum ports operate under vacuum sufficient strength to remove volatile products from the composite but of insufficient strength to pull the composite apart (a condition which promotes piling). Suitable negative operating pressures for vacuum ports are in the range of from 2 to 95 kilopascals.

The volatile products removed from the expanded composite at barrel vacuum port (31V2) contain, among other things, residual traces of moisture, terpene hydrocarbons, reacted stabilizer, HCl, low molecular weight fractions of lubricants and optional addenda described in further detail in Example 2. Generally the transition box vacuum port operates at a higher negative pressure than the barrel vacuum port to remove higher molecular weight or lower concentrations of decomposition products, but the vacuum level is regulated to avoid fiber piling. The increased vacuum causes the second dense composite, now free of the confines of the extruder screw(s), to abruptly expand and cool in three dimensions. This expansion is sufficiently violent that some of the remaining, unruptured biofiber cells that have become steam filled during processing explode thus opening their interior volume, for subsequent introduction of fluxed polymer. Newly formed and residual volatile products confined by the screw(s) in devolatilization mixing zone are evacuated. Transition box vacuum is in the range of from 50 to 95 kilopascals, preferably 55 to 90 kilopascals, and more preferably 60 to 80 kilopascals. The ratio of the transition box vacuum to barrel vacuum is in the range of from 1.0 to 20, preferably 2 to 15, and more preferably from 3 to 7.

Under certain processing conditions, biofiber can pile up in the vacuum ports. Such fiber piling is caused when the flow of volatiles through any vent or vacuum port carries with it biofiber or other particulate solid that deposits on and clogs the port. If the vacuum applied to any vacuum port is too strong, the resulting "explosive" expansion of compressed volatiles is sufficient to blow fibers/particulates out of the composite into the out gassing volatiles flowing through the vacuum port. As mentioned by Rauwendaal, supra, pp. 392–95 vent flow ("piling") can be minimized by optimizing screw design for the throughput, concentration of volatiles, material temperature, vacuum applied to various vacuum ports.

The ZSK megacompounder is a processor that can exert the appropriate conditions on composite. This processor has the following capacity.

TABLE 1

COMPARISON OF TORQUE
Super vs. MEG Acompounder

| ZSK SIZE | SUPER COMPOUNDER Nm/Shaft | MEGACOMPOUNDER Nm/Shaft | INCREASE % |
|---|---|---|---|
| 40 | 325 | 425 | 30 |
| 50 | N/A | 815 | N/A |
| 58 | 960 | 1,250 | 30 |
| 70 | 1,750 | 2,275 | 30 |
| 92 | 3,850 | 5,000 | 30 |
| 133 | 11,600 | 15,100 | 30 |

| Technical data Megacompounder ZSK | | 40 MC | 50 MC | 58 MC | 70 MC | 92 MC | 133 MC |
|---|---|---|---|---|---|---|---|
| Torque | Nm | 850 | 1,630 | 2,500 | 4,550 | 10,000 | 30,200 |
| Power at 600 | KW | 53 | 100 | 160 | 285 | 630 | 1920 |
| Power at max. speed | | | | | | | |
| 1200 rpm | KW | 106 | 200 | 320 | 570 | | |
| 1000 rpm | KW | | | | | 1,050 | 3,200 |
| Screw diameter | Mm | 40 | 50 | 58 | 70 | 92 | 133 |
| Channel depth | Mm | 7.1 | 8.9 | 10.3 | 12.5 | 16.3 | 23.5 |
| Length of machine approx.¹ | Mm | 2,900 | 3,500 | 4,200 | 5,500 | 6,700 | 10,000 |
| Width of machine approx.¹ | Mm | 720 | 800 | 850 | 1,000 | 1,000 | 1,700 |
| Height of machine approx.¹ | Mm | 1,400 | 1,400 | 1,400 | 1,550 | 1,650 | 1,750 |
| Total weight approx.¹ | Lbs | 2,600 | 4,500 | 7,700 | 21,000 | 27,000 | 55,000 |

¹Data based on a processing length of L = 24D (band diameter). Excluding discharge section but including main drive.

Without being bound by the following theory, application believe that the free radical decomposition of PVC has an endothermic induction period whose length depends on temperature and chemical concentration of material contaminates/decomposition products that build up in the product as the process progresses. The products include HCl, moisture, oxygen (entrained air), and stabilizer. Furthermore, applicants postulate that some of these contaminates contribute to the autocatalytic nature of the PVC decomposition following the induction period.

In forming the dense composites using the processes shown in FIGS. 1 through 3, the combination of process temperature, pressure, and imparted shear energy must be sufficient to expel entrapped air, residual moisture, and incipient HCl from the mixture, because these gaseous products impede the intimate contact between polymer and biofiber necessary to form a dense composite. In so doing, the mechanical shear energy imparted will rupture biofiber cell walls and stretch polymer random coils enabling interior electron rich chlorine groups of PVC to align and hydrogen bond with polar groups on the interior cell walls and irregular exterior surfaces of the biofiber. The preferred molecular polymer-biofiber configuration that applicants believe is formed in practice of the inventive processes.

Modeling of the intermeshing, co-rotating twin screw extruders used to practice the inventive process as described in Example 1 was conducted by Meijer and Elemans, *The Modeling of Continuous Mixers. Part I: The Corotating Twin-Screw Extruder*, Polymer Engineering and Science, Mid-March, 1988, Vol. 28, No. 5, pp. 275–289; which is hereby incorporated by reference. Their analysis arrives at theoretical values for SME (equation 39, FIGS. 9 & 10, and Table 6) and geometric and thermal scaling laws pp. 279–81. Similar volume limited and heat transfer limited scaling laws are reported in *Processing Lines*, supra, p 4.

Specific mechanical energy (kj–kg$^{-1}$) (SME) depends on processor variables (diameter, ratio of barrel length to diameter (L/D), screw rotation speed (RPM), screw design, etc.) and material parameters (viscosity, density, thermal stability, concentration of additives, etc.). For a given extruder and material combination, SME is equal to the mechanical power delivered by screws (kilowatts) divided by throughput (kilograms per second). Viscosity is a (non-linear) function of temperature, pressure, and polymer crosslinking and therefore a complex coupling exist between material and machine parameters. Since the temperatures in the high shear processing zones of the extruder(s) are well above the glass transition temperature of PVC (approximately 80 degrees Celsius), the temperature and pressure dependence of the continuous fluxed polymer phase can be roughly estimated (See C. W. Macosko, *Rheology Principles, Measurements, and Applications*, VBH-Wiley, 1996, pp. 100–01, equations 2.68.).

As the processing temperature increases, temperature effects overpower offsetting effects of increasing pressure generated by compression along the screw(s) and the viscosity drops.

However, crosslinking of PVC causes a rapid and accelerating rise in viscosity with increasing temperature once decomposition is under way. Because the inventive process operates at the decomposition temperature of PVC, thermal scaling considerations are important. Therefore, in order to take advantage of higher throughput capability of larger diameter, higher powered extruders changes in screw design will be necessary (Meijer et. al, supra, p 280).

Experimental

The following examples were performed to further illustrate the invention that is explained in detail above. The following information illustrates the typical production conditions and compositions and the tensile modulus of a structural member made from the pellet. The following examples and data contain a best mode.

Example 1

The processor used in Example 1 is a co-rotating, twin screw extruder designated ZSK™ 58 available from Krupp Werner & Pfleiderer Corp., having a screw diameter of 58 millimeters. The electromechanical drive train of the ZSK™ 58 is rated to deliver 104 kilowatts at 513 revolutions per minute at 100% torque. The barrel and screw configuration of the ZSK™ 58 is adjustable to continuously accomplish various unit operations. In this example, the ZSK™ 58 was configured to accomplish the following unit operations in the sequence shown in FIG. 3 including all optional processing zones: fiber feed, fiber conductive heating, fiber compression, fiber kneading, moisture vent, resin feed, blend conductive heating, blend compression, fluxed polymer kneading, vacuum devolatilization, and recompression. The screw components used for mixing, heating, compressing, and kneading operations are shown and described in Rauwendaal, *Polymer Extrusion*, supra Chapter 8 and pages 458–476; Meijer et al., supra, pages 282–284.

The inventive process unit operations can be accomplished using wide ranging extruder barrel and screw configurations. The knowledge necessary to select extruder barrel elements and assemble twin, co-rotating extruder screws is readily available from various extruder suppliers and is well known to those of ordinary skill in the art of fluxed polymer plastication.

The process startup was considered complete when the following set of steady-state conditions prevailed. Only then were the operating conditions changed to probe the limits of the process window shown in FIG. 4.

Wood fiber (−30/+80 mesh approximately) was fed through feed port (31FP1) at a rate of 120 kilograms per hour.

Thermoplastic PVC was fed at a rate of through feed port (31FP2) at a rate of 180 kilograms per hour.

Upon reaching stable, steady-state operating conditions, the process parameters were changed to those shown in Table I. If stable, steady-state operating conditions could be reestablished, the "new" conditions were assumed to lie within the stable process window of the inventive process. Likewise, if stable, steady-state operating conditions could not be reestablished, the "new" conditions were assumed to lie outside the stable process window of the inventive process shown in FIG. 4.

TABLE I

Melt temperature (° C.) was determined by inserting a thermocouple into the center of an approximately a 6 centimeter diameter ball of expanded composite material taken from the transition box (31TB). Since the transition box could not be operated under vacuum during sampling, the thermocouple probe was mounted on the end of the last extruder barrel to directly read the temperature of second expanded composite discharging into the transition box.

| Throughput | Screw Speed | Melt Temp. | % Torque | SME |
|---|---|---|---|---|
| 650 | 160 | 198 | 84 | 332 |
| 650 | 225 | 210 | 64 | 356 |
| 800 | 195 | 199 | 87 | 340 |
| 800 | 275 | 210 | 66 | 364 |
| 900 | 225 | 200 | 87 | 349 |
| 900 | 330 | 210 | 64 | 377 |
| 1000 | 265 | 200 | 83 | 353 |
| 1000 | 365 | 210 | 65 | 381 |
| 1000 | 350 | 210 | 67 | 377 |
| 0.5 ppm HCl | | | | |
| 1000 | 280 | 204 | 80 | 360 |
| No HCl | | | | |
| 650 | 160 | 192 | 86 | 340 |
| 650 | 305 | 210 | 46 | 347 |
| 800 | 205 | 200 | 87 | 358 |
| 800 | 315 | 210 | 57 | 360 |
| 900 | 230 | 200 | 87 | 357 |
| 900 | 345 | 210 | 59 | 363 |
| 1000 | 260 | 201 | 87 | 363 |
| 1000 | 360 | 210 | 62 | 358 |
| 0.5 ppm HCl | | | | |
| 1100 | 290 | 204 | 83 | 351 |
| 1100 | 375 | 212 | 65 | 356 |
| 1200 | 320 | 204 | 82 | 351 |
| 1200 | 385 | 210 | 71 | 366 |
| 1300 | 380 | 206 | 78 | 366 |
| 1300 | 415 | 210 | 71 | 364 |
| 1400 | 390 | 206 | 83 | 371 |
| 650 | 240 | 214 | 62 | 368 |
| 1000 | 340 | 214 | 70 | 382 |

Units: Throughput - kg-hr$^{-1}$ (kilograms per hour), Screw speed - revolutions per minute (-min$^{-1}$ or RPM); Melt Temperature - degrees Celsius (° C.); SME kilojoules per kilogram (kJ-kg$^{-1}$); Tensile Strength megapascals (MPa); Tensile Modulus gigapascals (GPa)

Referring to FIG. 4, the shaded region defines the stable operating limits of the inventive process. Within the "process window", the specific mechanical energy (SME) delivered to the materials charged to the extruder is above the minimum level required to form the dense composite material, i.e., introduce polymer into cell interiors. Point A at the intersection of line segments a) and b defines the lower bound of the process window. Given the material/extruder combination used in Example 1. The calculated SME for point A is about 340 kilojoules per kilogram, which approximates the MSME for this material/extruder combination. Correspondingly, point B, the theoretical maximum throughput point $Q_{max}$ on line segment b equals 1,100 kilograms per hour (2,420 pounds per hour). This value is calculated as the maximum mechanical power delivery of the ZSK 58 extruder (104 kilowatts) divided by the MSMF (defined by point A) of 340 kilojoules per kilogram. This value of $Q_{max}$ is in the units of kilograms per second which when multiplied by 3,600 yields the value given above. The maximum SME calculated from the data of Example 1 was about 380 kilojoules per kilogram, which produced melt temperatures in the range of from 214 to 218° C. These values define the tipper bound of the process window for the material/extruder combination of

EXAMPLE 1.

Example 2

Extrusion of Mull Casings

The unfoamed mull casing of FIG. 5 can be extruded in line by feeding about 35 kilograms per hour dense composite material to compression zone (23C2) operating under the conditions specified in Table II.

The foamed mull casing can be extruded in line by cofeeding 0.81 kilograms per hour of Reedy International AP-40 (nitrogen ($N_2$) gas generating azide agent) blowing agent (1.786 lb/hr, 2.38 wt %); and cofeedin 2.17 kilograms per hour of Rohm & Haas Paraloid K-415 acrylic modifier (4.776 lbs/hr, (6.37 wt %) through feedport (23FP2) into a 34.02 kilogram per hour process stream exiting compression zone (23C1). Compression zone (23C2) feeding extrusion di, (23DE) can be operated under the conditions specified in Table II to produce a foamed mull casing that typically will have the following properties.

Extruder Operating Conditions

Representative extruder operating conditions for making the mull casing, are shown in Table II.

TABLE II

| Substrate description, density | Standard PVC Wood Fiber Pellets 60% PVC, 40% Wood fiber – density = 0.6915 |
|---|---|
| Extruder Zone | Temperature in ° C. |
| Barrel Zone (23M1) | 175.0 |
| Barrel Zone (23C2)2 | 185.0 |
| Die Zone 1 | 185.0 |
| Die Zone 2 | 185.0 |
| Die Zone 3 | 185.0 |
| Screw Oil | 185.0 |
| Die Melt Temp | 199.0 |
| Motor Screw Pot | 250.0 |
| other conditions: | |
| Motor Screw RPM | 10.10 |
| AMPS | 60.00 |
| Head Pressure | 2840 psi |
| Vacuum at Vent Port | 10.00 psi |
| Feeding Method | SCHENCK |

TABLE II-continued

| Substrate description, density | Standard PVC Wood Fiber Pellets 60% PVC, 40% Wood fiber – density = 0.6915 |
|---|---|
| Feed Rate (lb/hr) | 75.00 |
| Puller Pot | 395.0 |
| Puller RPM | 6.600 |
| Production Speed | |
| (inches/min) | 48.50 |
| (grams/foot) | 156.0 |
| (Lbs/hr) | 83.00 |
| Vacuum Calibrator Block | 6.000 psi |
| Vacuum First Tank | 1.000 psi |
| Cooling Water Temperature (° F.) | 45.00 psi |
| Co-Extrusion Use | CAPPING layer |
| CoEx Zone 1 Temp | 180.0° C. |
| CoEx Zone 2 Temp | 180.0° C. |
| CoEx Zone 3 Temp | 180.0° C. |
| CoEx Zone 4 Temp | 180.0° C. |
| CoEx Adaptor Temp | 180.0° C. |
| Motor Screw RPM | 7.100 |
| Motor Screw AMPS | 8.600 |
| CoEx Head Pressure | 7940 psi |

Expected Foamed Composite Test Results

| | |
|---|---:|
| DENSITY (G/CC) | 0.87 |
| FLEX MODULUS (psi) | 333,115 |
| NAIL INSERTION (POUNDS) | 129 |

Coefficient of Linear Thermal Expansion

The mull casing can be tested for linear thermal expansion using (ASTM No. D 696-91e1). Typical expected results are summarized in the Table III.

TABLE III

| Identification | Thermal Coefficient of Expansion (C.O.E.) |
|---|---|
| GEON ® 87020 (standard cellular PVC; no fiber)* | $3.30 \times 10^{-5}$ |
| Foamed | $1.83 \times 10^{-5}$ |
| Unfoamed | $1.74 \times 10^{-5}$ |

*Data provided for comparison - showing the significant reduction in COE expected for profiles extruded from dense composite material produced by the inventive process.

Typical Shrinkage Test Results Expected

Percent (%) Shrinkage=1.25 (Test Method is ASTM D1042-60 min. heat @ 180° F. Air oven)

We have shown that PVC composite materials can be made at unexpected temperatures and pressures resulting in improved physical properties. These improved physical properties result from an interaction between the polymer and fiber that results in an improved compatibility at the polymer fiber interface. Further, the polymer fully fills each fiber cell internal structure resulting in improved polymer fiber interaction. This improvement is simply not a result of simply increasing all aspects of energy input to the polymer, but results from a careful adjustment of all process conditions to result in a quantum leap in composite performance and process technology. The process conditions we have explored including specific mechanical energy, process efficiency, relative screw rotation, water content, liquid polymer viscosity of the fluxed or fluidized polymer material, the pressure within the barrel at maximum temperature, the reduced pressure at vent ports, reduction in cooling after maximum temperature is attained in the polymer fluxed material, and the devolatilization pressures, all cooperate to produce the poly(vinylchloride) biofiber composite in a substantially improved mechanical form.

The above specification, drawings, discussion, examples and data provide a basis for understanding the invention that has been developed to date. The invention is illustrated in this material, however, since many embodiments of the invention can be made without departing from the spirit and scope of the invention, the invention resides in the claims hereinafter appended.

We claim:

1. A process for making a thermoplastic biofiber composite, the process comprising the steps of:
   (a) introducing biofiber into a processor having a first and second zones including a first and second feed port, said biofiber having a moisture content and further comprising cells with an interior volume, into said first feed port into said first zone at a temperature of greater than 100° C. to remove water from the biofiber to form dried biofiber;
   (b) introducing thermoplastic resin comprising poly(vinylchloride) into said second zone through said second feed port;
   (c) heating, shearing and compressing the resin to form a fluxed resin, combining the fluxed resin and dried biofiber into a subsequent zone or zones such that the resin and biofiber are compressed and sheared to introduce the fluxed resin into the cell interior forming a compatable thermoplastic biofiber composite, expanding and evaporatively cooling the composite, reheating and shearing the composite at conditions of temperature and pressure to form a second compressed composite while removing volatile materials from the composite;
   wherein the ratio of the thermoplastic biofiber composite density to theoretical maximum density exceeds 0.7 and the resin occupies greater than 50% of the interior volume of said biofiber cells.

2. The process of claim 1 wherein the specific mechanical energy (SME) is greater than 280 Kj–Kg$^{-1}$.

3. The method of claim 1 wherein the SME comprises 300–500 Kj–Kg$^{-1}$.

4. The method of claim 1 wherein the SME comprises 340 to 450 Kj–Kg$^{-1}$.

5. The method of claim 1 wherein the process efficiency in the extruder barrel zone of maximum temperature is about 0.7–0.9.

6. The method of claim 1 wherein the relative screw rotation in the barrel zone of maximum temperature is about 0.35–0.7.

7. The method of claim 1 wherein the water content of the biofiber introduced into the processor is less than about 28% and the moisture of the fiber in contact with the fluxed resin is less than 2-wt. % of the fiber.

8. The method of claim 1 wherein the poly(vinylchloride) polymer in the barrel zone of maximum temperature achieves a viscosity of less than about 6500 pascal-seconds at 150 sec$^{-1}$ shear rate at or above 190° C.

9. The method of claim 1 wherein the reduced pressure in the devolatilization stage after the zone of maximum temperature is about a negative 5 to a negative 40 Kpascals and the moisture is less than 1 wt % of the composite.

10. The method of claim 1 wherein after the processor zone of maximum temperature, the material enters a cooling stage in which the material is cooled to a temperature sufficient to quench any thermal decomposition of the polymer material.

11. The method of claim 10 wherein the material is cooled at least 10° C.

12. The method of claim 11 wherein in the cooling stage the material is devolatilized at a pressure of about a negative 50 to a negative 95 Kpascals.

13. The process of claim 1 wherein in the zone of maximum temperature, the polymer encapsulates and penetrates the biofiber cells at a temperature between 190° C. and 215° C. at a pressure of about 20 to 100 Kpascals.

14. A continuous process for making a dense thermoplastic-biofiber composite, the process comprising the steps of:
   (a) introducing biofiber into a processor comprising a plurality of isolated zones, each zone including means for independently controlling temperature and pressure therein, a first zone including a vent, a first and second zones respectively including first and second feed ports, and separate zones respectively including a first, a second, and a third vacuum port, said biofiber having a moisture content and further comprising cells with an interior volume, into said first zone through said first feed port, and retaining biofiber within said first zone at a temperature greater than 100° C. for sufficient time to vaporize and vent said moisture to form partially dried biofiber;
   (b) introducing thermoplastic resin including poly(vinylchloride), into said second zone through said second feed port;
   (c) heating, shearing, and compressing resin to form fluxed resin;
   (d) conveying fluxed resin to a subsequent zone to remove impurities and decomposition products through said first vacuum port forming a purified fluxed resin;
   (e) transferring said purified fluxed resin from said subsequent zone and said partially dried biofiber from said first zone into a fourth processor zone;
   (f) compressing and shearing fluxed resin and dried biofiber at first conditions of temperature, pressure, and shear rate sufficient to introduce fluxed resin into said cell interior volume to form a first compressed composite including first volatile products;
   (g) conveying first compressed composite to a fifth processor zone, and therein expanding and evaporatively cooling said first compressed composite by evacuating said first volatile products through said second vacuum port, to form a first expanded composite;
   (h) conveying first expanded composite to a sixth processor zone and therein mixing, recompressing, and re-heating said first expanded composite at second conditions of temperature, pressure, and shear rate sufficient to re-homogenize and re-compress first expanded composite to form a second compressed composite including second volatile products;
   (i) conveying second compressed composite to a seventh processor zone, and therein expanding and evaporatively cooling said second compressed composite by evacuating said second volatile products through said third vacuum port, to form a second expanded composite; and
   (j) conveying second expanded composite to an eighth processor zone and therein mixing and simultaneously compacting said second expanded composite to form a dense thermoplastic biofiber composite material;
wherein the composite comprises less than about 8000 ppm moisture, the ratio of composite density to the theoretical maximum density exceeds 0.7 and polymer occupies greater than 50% of the interior volume of said biofiber cells.

15. The process of claim 14, wherein in step (f) takes place at a temperature greater than about 205° C. and a shear rate of 50 to 1000 sec$^{-1}$.

16. The process of claim 14, wherein the ratio of said third to second vacuum port pressures are in the range of from about 1 to 20.

17. The method of claim 14, wherein said second and third vacuum ports are independently operated at negative pressures between 5 and 95 kilopascals.

18. The method of claim 14, wherein said first vacuum port is operated at a negative pressure of from about 10 to about 95 kilopascals.

19. The method of claim 14, wherein said second vacuum port is operated at a negative pressure from about 5 to about 40 kilopascals.

20. The process of claim 14, wherein said third vacuum port is operated at a negative pressure from about 50 to about 95 kilopascals.

21. The process of claim 14, wherein said biofiber comprises a cellulosic fiber having an aspect ratio of about 2 to about 10.

22. The process of claim 20, wherein said aspect ratio of about 4 to about 9.

23. The process of claim 14, wherein the temperature is reduced by an amount greater than 2° C. in step (g) and said first volatile products comprise moisture, terpene hydrocarbons, HCl, reacted tin thioglycolate stabilizer, and decomposition products.

24. The process of claim 14 wherein the temperature is reduced by an amount greater than 2° C. in step (i) and second volatile products comprise moisture, terpene hydrocarbons, reacted tin thioglycolate, and decomposition products.

25. The process of claim 14, wherein process steps (I) and (j) are repeated one or more times before proceeding to step (k).

26. The process of claim 14, comprising the following additional steps:
(k) optionally mixing said high density composite with at least one additive to form a modified composite;
(l) extruding said modified composite through a profile die to form an extruded profile having an exterior surface, and
(m) optionally coextruding one or more fluxed polymer capstocks on pre-determined regions of aid extruded profile exterior surface.

27. The process of claim 14, comprising the additional step:
(n) pelletizing said dense composite to produce a high-density biofiber composite pellet.

28. The process of claim 14, wherein said first isolated processor zone is contained within a first independently controlled extruder, said second through seventh isolated processor zones are contained within a second independently controlled extruder, said eighth isolated processor zone is contained within a third independently controlled extruder, and wherein said fourth processor zone further includes a third feed port and in process step (a) said partially dried biofiber is optionally compressed in process step (a) prior to being transferred to said fourth processor zone within said second extruder through said third feed port in process step (e), and wherein said seventh processor zone comprises a transition box and said eighth processor zone further includes a fourth feed port communicating with said transition box through which said second expanded composite is conveyed to said eighth processor zone contained within said third extruder.

29. The process of claim 28, wherein said second extruder is maintained at a steady state screw rotation producing sufficient shear energy to flux any granular resin.

30. The process of claim 28, wherein said fourth processor zone further comprises a high free-volume mixing region.

31. The process of claim 28, wherein said biofiber is pre-dried to a moisture content of less than about 2 weight percent water, pre-blended in a dry environment with said thermoplastic resin, introduced into said high free-volume region through said third feed port and process steps (a) through (t) are omitted.

32. A process for making a thermoplastic biofiber composite, the process comprising the steps of:
(a) introducing a biofiber into a processor having a first and second zones including a first and second feed port, said biofiber having a moisture content and further comprising cells with an interior volume, into said first feed port into said first zone at a temperature greater than 100° C. to remove water from the biofiber;
(b) introducing thermoplastic resin comprising poly (vinylchloride) into said second zone through second feed port; and
(c) combining the resin and biofiber in a subsequent zone or zones such that the resin and biofiber are compressed and sheared to introduce the resin into the cell interior at conditions of temperature and pressure to form a composite while removing volatile materials from the composite;
wherein the processor having two or more vacuum devolatilization stations that remove water and decomposition products from the biofiber, the processor having at least one zone that exceeds 205° C. for at least 2 seconds during the processing of the composite, the processor applying a specific mechanical energy of about 300 to 400 Kj-kg$^{-1}$ to the composite wherein the ratio of composite density to theoretical maximum density exceeds 0.7 and the resin occupies greater than 50% of the interior volume of said biofiber cells.

33. The process of claim 32 wherein the vacuum devolatilization stations are operated at negative pressure about 20 to 40 Kpascals.

34. The process of claim 32 wherein the temperature of the composite exceeds 208° C. for 5 seconds.

35. The process of claim 32 wherein the specific mechanical energy comprises 340 to 380 Kj–Kg$^{-1}$.

36. The process of claim 32 wherein the biofiber has less than about 1 wt % moisture prior to processing.

37. The process of claim 32 wherein the process efficiency is greater than 0.75.

38. The process of claim 32 wherein the relative screw rotation is about 0.4 to 0.7 and the processor produces greater than about 25 kilograms of composite-hr$^{-1}$.

39. The process of claim 32 wherein the processor is operated at a through put of about 20 kilograms per hour and at a relative through put of less than about 80%.

40. The process of claim 32 wherein the specific mechanical energy (SME) is greater than 280 Kj–Kg$^{-1}$.

41. The method of claim 32 wherein the SME comprises 300–500 Kj–Kg$^{-1}$.

42. The method of claim 32 wherein the SME comprises 340–450 Kj–Kg$^{-1}$.

43. The method of claim 32 wherein the process efficiency in the extruder barrel zone of maximum temperature is about 0.7–0.9.

44. The method of claim 32 wherein the relative screw rotation in the barrel zone of maximum temperature is about 0.35–0.7.

45. The method of claim 32 wherein the water content of the biofiber introduced into the processor is less than about 28%.

46. The method of claim 32 where in the poly(vinylchloride) polymer in the barrel zone of maximum temperature achieves a viscosity of less than about 6500 pascal-seconds at 150 sec$^{-1}$ shear rate at or above 190° C.

47. The method of claim 32 wherein the reduced pressure in the devolatilization stage after the zone of maximum temperature is about a negative 5 to a negative 40 Kpascals.

48. The method of claim 32 wherein after the processor zone of maximum temperature, the material enters a cooling stage in which the material is cooled to a temperature sufficient to quench any thermal decomposition of the polymer material.

49. The method of claim 42 wherein the material is cooled at least 10° C.

50. The method of claim 43 wherein in the cooling stage the material is devolatilized at a pressure of about a negative 50 to a negative 95 Kpascals.

51. The process of claim 32 wherein in the zone of maximum temperature. the polymer encapsulates and penetrates the biofiber cells at a temperature between 190° C. and 215° C. at a pressure of about 20 to 100 Kpascals.

52. A continuous process for making dense, thermoplastic-biofiber composite, the process comprising the steps of:

(a) providing a first extruder comprising at least a biofiber drying zone having a biofiber feed port and vent, a blending one with resin feed port, a compression zone, a shear zone, an isolated first devolatilization zone having a first vacuum port, an isolated recompression zone, and transition box having second vacuum port; further providing a second extruder including compression zone and feed port communicating with said first extruder transition box;

(b) introducing biofiber, having a moisture content and cells with an interior volume, into said biofiber drying zone maintained at a temperature of greater than 100° C. through said biofiber feed port, retaining said biofiber in said drying zone for sufficient time to vaporize and vent said moisture to form partially dried biofiber;

(c) conveying partially dried biofiber into said blending zone and simultaneously introducing thermoplastic resin including poly(vinylchloride) through said resin feed port into said blending zone and therein mixing biofiber with resin to form a blend;

(d) conveying biofiber-resin blend to said compression zone, and therein fluxing said resin, and mixing biofiber with fluxed thermoplastic polymer, shearing said fluxed polymer and biofiber under first conditions of temperature, pressure, and shear rate sufficient to introduce fluxed polymer into said cell interior volume to form a first compressed composite including first volatile products;

(e) expanding an evaporatively cooling first compressed composite in said isolated devolatilization zone, while evacuating first volatile products through said first vacuum port to form a first expanded composite;

(f) mixing, re-compressing, and re-heating first expanded composite in said isolated recompression zone under second conditions of temperature, pressure, and shear rate sufficient to re-homogenize and re-compresses said first expanded composite to form a second compressed composite including second volatile products;

(g) expanding and evaporatively cooling second compressed composite in said transition box while evacuating second volatile products through said second vacuum port to form a second expanded composite;

(h) introducing second expanded composite to said second extruder compression zone through said second extruder feed port, and therein mixing and simultaneously compacting said second expanded composite to form a dense thermoplastic biofiber composite material;

wherein the ratio of composite density to the theoretical maximum density exceeds 0.7, polymer occupies greater than 50% of the interior volume of said biofiber cells, and the relative screw speed exceeds 0.35 and the relative through put exceeds 0.3.

53. The process of claim 52, wherein the specific mechanical energy (SME) in steps (d) and (f) exceeds 300 kJ–kg$^{-1}$.

54. The method of claim 52, wherein said first and second vacuum ports are independently operated at a negative pressure between 5 and 95 kilopascals.

55. The method of claim 52, wherein said first vacuum port is operated at a negative pressure from about 5 to about 40 kilopascals.

56. The process of claim 52, wherein said second vacuum port is operated at a negative pressure from about 5 to about 95 kilopascals.

57. The process of claim 52, wherein the ratio of said second to first vacuum port pressure is in the range of from 1 to 20.

58. The process of claim 28, wherein said extruder screw comprises undercut flights and said third feed port discharges into said high free-volume region.

* * * * *